United States Patent [19]
Kobayashi

[11] Patent Number: 5,517,481
[45] Date of Patent: May 14, 1996

[54] OPTICAL RECORDING AND REPRODUCING APPARATUS WHEREIN DATA IS RECORDED BY STEPWISE SHIFTING THE EDGE POSITION OF EACH PIT

[75] Inventor: Seiji Kobayashi, Kanagawa, Japan

[73] Assignee: Sony Corporation, Japan

[21] Appl. No.: 268,200

[22] Filed: Jun. 29, 1994

[30] Foreign Application Priority Data

Jul. 2, 1993 [JP] Japan ................................. 5-164406

[51] Int. Cl.$^6$ ....................................... G11B 7/00
[52] U.S. Cl. ........................... 369/124; 369/58; 369/59
[58] Field of Search ............................. 369/59, 124, 54, 369/58, 48, 47, 32, 44.26, 44.34

[56] References Cited

U.S. PATENT DOCUMENTS

| | | | |
|---|---|---|---|
| 4,873,680 | 10/1989 | Chung et al. | 369/58 |
| 5,345,434 | 9/1994 | Ide et al. | 369/58 |
| 5,347,505 | 9/1994 | Moritsugu et al. | 369/59 |
| 5,414,689 | 5/1995 | Maeda et al. | 369/116 |
| 5,418,770 | 5/1995 | Ide et al. | 369/116 |
| 5,422,865 | 6/1995 | Katayama et al. | 369/13 |

FOREIGN PATENT DOCUMENTS

| | | |
|---|---|---|
| 0477892A2 | 4/1992 | European Pat. Off. . |
| 0540345A1 | 5/1993 | European Pat. Off. . |
| 0593037A2 | 4/1994 | European Pat. Off. . |
| 62-3445 | 1/1987 | Japan . |
| 63-48617 | 3/1988 | Japan . |
| 63-231733 | 9/1988 | Japan . |
| 63-298818 | 12/1988 | Japan . |
| 1-185839 | 7/1989 | Japan . |
| 1-263964 | 10/1989 | Japan . |
| 3-66735 | 10/1991 | Japan . |
| 04366426 | 12/1992 | Japan . |

*Primary Examiner*—Nabil Z. Hindi
*Attorney, Agent, or Firm*—Limbach & Limbach; Philip M. Shaw, Jr.

[57] ABSTRACT

An information recording medium on which digital information is recorded while the edge position of each pit on the recording medium is stepwise shifted from a predetermined reference position in accordance with a code being recorded within a predetermined shift period shorter than a transient period of a reproduced signal, and an information reproducing apparatus for reproducing the recorded information from the recording medium, includes clock generating element for generating a clock synchronized with a reference position in phase on the basis of a reproduced signal obtained from the optical detection system, level detection element for detecting the reproduction level within the transient period of the reproduced signal at a timing defined by the clock, first decoding element for decoding recording data corresponding to the shift amount of the edge position of an information pit, correction value generating element for storing predetermined correction values to correct errors in a decoding operation, and outputting a correction value in correspondence with the data decoded by said first decoding element, adding element for adding the correction value with the reproduction level of a target code to be decoded, and second decoding element for decoding the recording data corresponding to the shift amount of the edge position of the information pit on the basis of the output of the adding element.

18 Claims, 38 Drawing Sheets

FIG. 26A BIT ARRAY
FIG. 26B RF SIGNAL
FIG. 26C CLOCK
FIG. 26D 1/2-DIVIDED OUTPUT
FIG. 26E FB
FIG. 26F $\overline{WE}$
FIG. 26G $\overline{OE}$

1B INITIAL VALUE SETTING
　 DATA AREA

1A USER DATA AREA

FIG. 39

| GROUP No. | $a_{n-1}$ | $b_{n-1}$ | $a_n$ | $b_n$ |
|---|---|---|---|---|
| 0 | 0 | 0 | 0 | 0 |
| 1 | 0 | 0 | 0 | 1 |
| 2 | 0 | 0 | 0 | 2 |
| 3 | 0 | 0 | 0 | 3 |
| ⋮ | ⋮ | ⋮ | ⋮ | ⋮ |
| 7 | 0 | 0 | 0 | 7 |
| 8 | 0 | 0 | 1 | 0 |
| 9 | 0 | 0 | 1 | 1 |
| 10 | 0 | 0 | 1 | 2 |
| 11 | 0 | 0 | 1 | 3 |
| ⋮ | ⋮ | ⋮ | ⋮ | ⋮ |
| 15 | 0 | 0 | 1 | 7 |
| 16 | 0 | 0 | 2 | 0 |
| 17 | 0 | 0 | 2 | 1 |
| ⋮ | ⋮ | ⋮ | ⋮ | ⋮ |
| 63 | 0 | 0 | 7 | 7 |
| 64 | 0 | 1 | 0 | 0 |
| 65 | 0 | 1 | 0 | 1 |
| 66 | 0 | 1 | 0 | 2 |
| 67 | 0 | 1 | 0 | 3 |
| ⋮ | ⋮ | ⋮ | ⋮ | ⋮ |
| 511 | 0 | 7 | 7 | 7 |

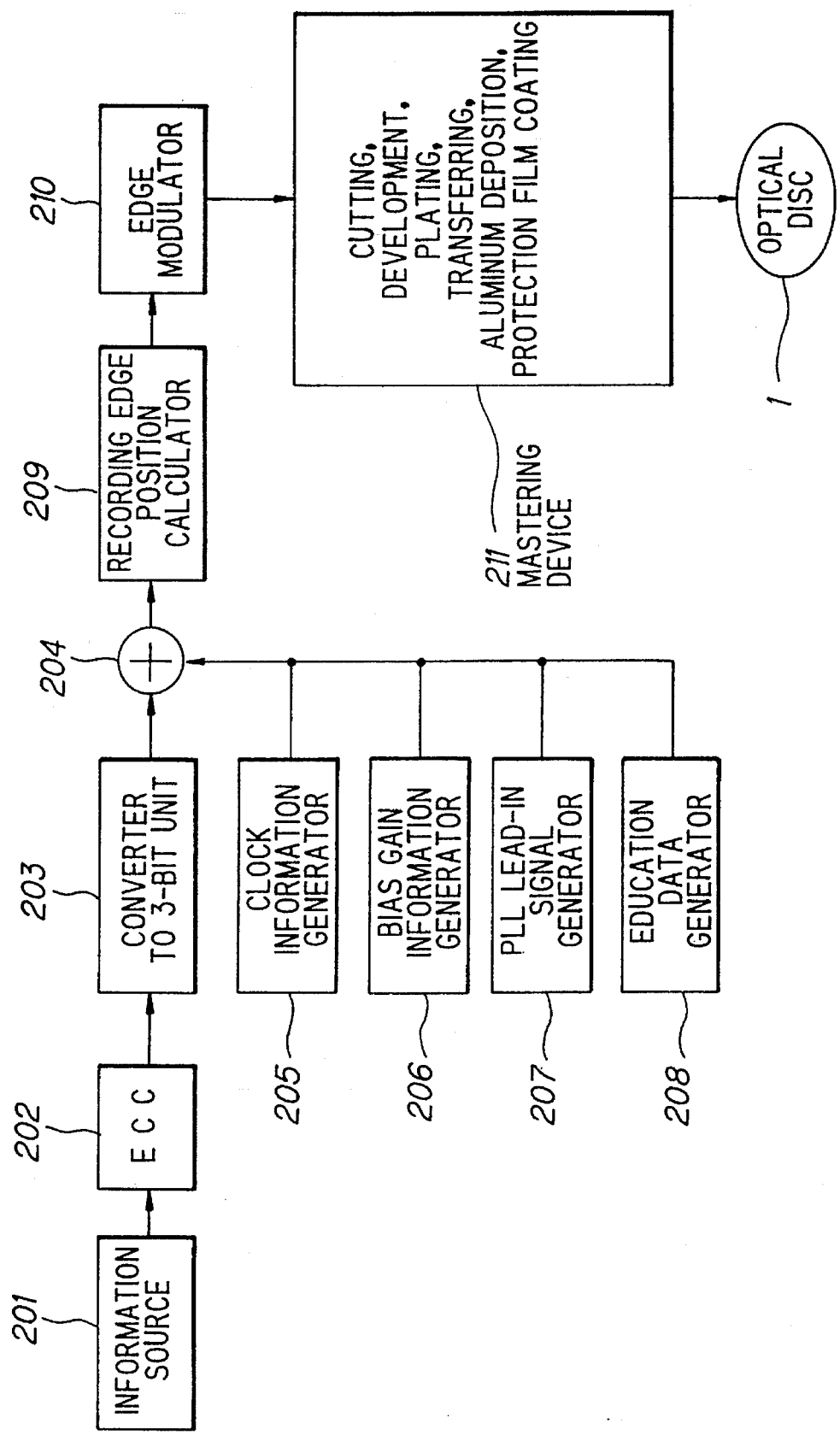

OPTICAL RECORDING AND REPRODUCING APPARATUS WHEREIN DATA IS RECORDED BY STEPWISE SHIFTING THE EDGE POSITION OF EACH PIT

BACKGROUND OF THE INVENTION

1. Field of the Invention

This invention relates to an information recording medium such as an optical disc, a magnetooptical disc or the like, and an information reproducing apparatus which is suitably used to reproduce information from the information recording medium.

2. Description of Related Art

For a conventional optical disc used in a CAV (constant angular velocity) mode, a servo byte section is periodically provided at a prescribed position on each track, and clock pits to generate reference clocks and wobbled pits for tracking are formed in the servo byte section. The reference clocks (channel clocks) are formed in accordance with the clock pits, and information is digitally recorded in accordance with pits whose length is set to be integer times of the period of the reference clocks.

A system which is used in a CLV (Constant Linear Velocity) such as a CD (Compact Disc) is formed with no clock pit, however, the length of recorded pits and the interval of the pits are set to be integer times (any one of nine length levels from about 0.9 μm to 3.3 μm for CD) of the period (0.3 μm) of the reference clocks (channel clocks) (so-called self-clock system is adopted), and clock components contained in reproduced RF signals are extracted to cut out the recorded information on a pit basis.

For a video disc which is the same type of optical disc as the CD, video signals are FM-modulated, recorded and reproduced on the basis of the difference in length between pits which are designed in a finer size than those for CDs. This will be described in more detail representatively using a case where signals are recorded in the CAV mode on a 55 mm-radius disc.

In the case of the video disc, the lightest portion of recording information is recorded with signals of 9.3 MHz while the darkest portion is recorded with signals of 7.6 MHz, and these signals correspond to the lengths of 1.075 μm and 1.316 μm on the 55 mm-radius disc, respectively. It is well known that a very beautiful picture can be reproduced by reproducing information from the disc which is recorded in the above recording mode. Assuming that the picture thus obtained is represented in 128 gradation levels (that is, variation in brightness of the picture is represented in 128 levels), this means that pits constituting the picture thus obtained are recorded while varying the pit period in 128 or more levels, and reproduced. That is, the minute variation in pit length and pit interval as represented by the following equation reflects the video signals:

$$(1.316 \text{ μm} - 1.075 \text{ μm})/128 = 0.002 \text{ μm}$$

Although such minute variation in pit length is recordable as described above, the minimum variation unit in pit length for CDs must be set to 0.3 μm which is a larger value than 0.002 μm, and this is mainly caused by the fact that recording and reproducing methods which have been recently used for the CDs are not optimum.

In Japanese Patent Application No. 3-167585, the applicant of this application previously proposed a recording and reproducing method in which digital information is recorded by shifting stepwise the front edge or rear edge position of an information pit from a predetermined reference position in accordance with recording information. According to the recording and reproducing method, the variation in pit length and pit edge position can be detected with very high precision, so that the digital information can be recorded with the very minute variation which have hitherto seemed to be impossible, and thus a higher density recording can be performed.

FIG. 1 shows a timing chart showing the principle of stepwise shifting the edge position of each pit to record information, which was previously proposed by the applicant.

As shown in FIG. 1, a recording signal shown at a middle stage of FIG. 1, is generated while subjected to a pulse width modulation (PWM) in accordance with recording data, and on the basis of the recording signal thus generated are formed pits each of which has the length corresponding to the distance between zero-cross points thereof. Through this operation, the edge position of each pit can be stepwise shifted from a reference position as indicated by a reference clock. In accordance with this shift, any one of data of eight stages (positional levels) from "0" to "7" (represented by three bits) can be recorded for one edge.

FIG. 2 shows a timing chart showing the principle of reproducing information from the pits thus recorded. An RF signal shown at a top stage of FIG. 2 which is reproduced from an information recording medium is greatly amplified to obtain a binary RF signal. Clock pits are formed on a disc having information recorded thereon, and thus a reference clock shown at a third stage of FIG. 2 is generated on the basis of the clock pits. Further, a sawtooth-wave signal shown at a bottom stage of FIG. 2 is generated in synchronism with the reference clock. The edge position of each information pit is detected by detecting a timing at which the sawtooth-wave signal and the binary RF signal cross over each other.

In addition to the above proposed method, the applicant also previously proposed a method of two-dimensionally decoding data recorded in the above manner. In this method, educational pits are beforehand formed on an optical disc, and 64 (=8×8) combinations from (0,0) to (7,7) can be provided for a combination (M,N) of the front-end edge M and the rear-end edge N of each educational pit. The educational pits thus recorded are reproduced, and then reference points are mapped on a RAM in correspondence with the reproduced levels of the educational pits as shown in FIG. 3.

Thereafter, ordinary data pits are reproduced to sample the levels of the reproduced RF signal at two positions of the front-end edge and the rear-end edge of each data pit and obtain a point on the RAM which is specified by the two levels. Thereafter, a reference point which is nearest to the point is obtained, and the data are decoded on the assumption that the data pit corresponding to the above point has the same edge combination as the educational pit corresponding to the nearest reference point.

In such a method that the reference points corresponding to the educational pits are mapped on a memory and then the nearest reference point is obtained to decode the data, however, when an intersymbol interference state varies, the content of the RAM, that is, all the positions of the reference points must be re-written in accordance with the variation of the intersymbol interference state. For example, when an optical disc has any skew, the intersymbol interference is varied at high speed in accordance with rotation of the optical disc, however, it is impossible to re-write data on the RAM at high speed in correspondence with the high-speed rotation of the optical disc.

Further, when the level at a sampling point for a data pit is represented with 8 bits, two-points information can be mapped on a RAM having an address space of 16 bits. The number of sampling points is preferably increased as many as possible. However, if the number of the sampling points is set to three or more, the scale of the RAM is unpracticably large. For example for three sampling points, an address space of 24 bits is required, and in this case 16 Mbits are required for capacity of the RAM. For four sampling points, the scale of the RAM is required to have capacity of 256 times of the above case. It is practically impossible to use a RAM having such a large scale capacity.

Still further, the method as described above needs the educational pits, and the educational pits are preferably formed in a larger amount. In addition, in order to learn the intersymbol interference varying at high speed, the educational pits are required to be frequently recorded. However, when a large number of educational pits are recorded as described above, a recording area for data pits which are to be originally recorded and reproduced is reduced, and thus the capacity of the disc is reduced.

SUMMARY OF THE INVENTION

An object of this invention is to provide an information recording medium and an information reproducing apparatus for reproducing information from the information recording medium, in which data can be accurately decoded without reducing the recording capacity of a disc even when an intersymbol interference state is varied at high speed.

In order to attain the above object, the information reproducing apparatus for reproducing an information recording medium on which digital, information is recorded while the edge position of an information pit is stepwise shifted from a predetermined reference position in accordance with a code being recorded within a predetermined shift period (for example, a shift period Ts in FIG. 5) shorter than a transient period (for example, a rise-up period tr, a fall time tf in FIG. 9) of a reproduced signal, which is determined in accordance with transfer characteristics of an optical detection system (for example, a pickup 3 in FIG. 8) for scanning a recording medium with light beam along an information pit array, thereby reproducing recording information from a disc medium (for example an optical disc 1 in FIG. 4) on which digital data are recorded, is characterized by including clock generating means (PLL circuit 7 in FIG. 17, for example) for generating a clock which is synchronized with a reference position in phase on the basis of a reproduced signal obtained from the optical detection system, level detection means (A/D converter 9 in FIG. 17, for example) for detecting the reproduction level in a transient period of the reproduced signal at a timing defined by the clock, first decoding means (decoding circuits 84, 85 and 86 in FIG. 17, for example) for decoding recording data corresponding to the shift amount of the edge position of an information pit, correction value generating means (memory 87 in FIG. 17, for example) for storing predetermined correction values to correct errors in a decoding operation, and outputting a correction value in correspondence with the data decoded by the first decoding means, adding means (adding circuit 88 in FIG. 17, for example) for adding the correction value with the reproduction level of a code which is a decoding target, and second decoding means (decoding circuit 89 in FIG. 17, for example) for decoding the recording data corresponding to the shift amount of the edge position of the information pit on the basis of the output of the adding means.

In the correction value generating means, a correction value may be generated to correct the intersymbol interference from a code which is adjacent to the code serving as the decoding target.

In the correction value generating means, correction values may be beforehand generated and stored using the reproduction levels of educational pits (educational pit P6 in FIG. 4, for example) which are provided as information pits to obtain decode values of all edge patterns.

At least 64 of educational pits may be provided on the disc medium.

The correction value generating means may be equipped with a first memory (memory 87A in FIG. 32, for example) for storing a first correction value to correct the intersymbol interference from codes which are located at front and rear sides of the decode-target code and just adjacent to the target code, and a second memory (memory 87B in FIG. 32, for example) for storing a second correction value to correct the intersymbol interference from codes which are located at front and rear sides of the decode-target code and each of which is the second code from the target code, and the adding means may add the reproduction level with the first and second correction values.

A plurality of groups each comprising the first decoding means, the correction value generating means and the adding means (for example, a group of decoding circuits 84 to 86, a memory 87 and an adding circuit 88, and a group of decoding circuits 104 to 106, a memory 107 and an adding circuit 108) may be connected to one another in a cascade connection.

At all of the plural stages of the cascade-connection, signals to be corrected may be reproduced signals which are obtained from the optical detection system.

In this case, target codes to be supplied to the adding means of all the stages (adding circuits 88 and 108 in FIG. 20, for example) may be substantially the same code (code to be input to the decoding circuit 85 in FIG. 30, for example) which is not added with the correction value at any adding means of any stage (for example, adding circuit 88 or 108 in FIG. 20).

The stage number of the cascade-connected groups may be set to an even number.

Altering means (learning function circuit 121 of FIG. 25, for example) for altering the correction value of the correction value generating means by feeding back the output result of the second decoding means may be further provided.

The altering means may be provided with ideal value calculating means (calculation circuit 131 of FIG. 25, for example) for calculating an ideal reproduction level from the output of the second decoding means, and difference means (adding circuit 132 of FIG. 25, for example) for calculating a difference value between the ideal reproduction level and an actual reproduction level to alter the correction value of the correction value generating means in accordance with the difference value.

The altering means may be further provided with multiplying means (multiplying circuit 133 of FIG. 25, for example) for multiplying the difference value by a constant (for example, $\alpha$) to prevent oscillation of the correction value of the correction value generating means, and limiter means (limiter 134 of FIG. 25, for example) for limiting the output of the multiplying means within a predetermined range.

Further, detection error correcting means (error detecting and correcting circuit 13 of FIG. 34, for example) for detecting presence or absence of an error for the output of the second decoding means and correcting the error, and altering means (learning function circuit 121 of FIG. 34, for example) for altering the correction value of the correction value generating means in accordance with a decode value after the error correction may be further provided.

The altering means may be provided with ideal value calculating means (calculating circuit 131 of FIG. 34, for example) for calculating the ideal reproduction level from the output of the correction means, difference means (adding circuit 132 of FIG. 34, for example) for calculating the difference value between the ideal reproduction level and an actual reproduction level, and selection means (switch 183 of FIG. 34, for example) for selecting any one of the difference value of the difference means and a predetermined constant in accordance with the result of the error detecting and correcting means.

The selection means may select the difference value of the difference means when no error is detected by the error detecting and correcting means, and select the predetermined constant (for example "0") when any error is detected.

The correction value generating means may generate a correction value which is varied in accordance with a rotational position of a disc medium which is sectioned into a predetermined number of parts (eight parts as shown in FIG. 35, for example).

Pits which provide initial values of the correction value generating means may be collectively recorded in a predetermined area of the disc medium (in an initial value setting data area 1B of FIG. 38, for example).

The information recording medium of this invention is characterized in that the initial values to alter the correction value of the correction value generating means (memory 87 of FIG. 20, for example) are collectively recorded in a predetermined area (initial value setting data area 1B of FIG. 38, for example).

In the information reproducing apparatus thus constructed, the reproduced signal is decoded by the decoding circuits 84 to 86. The correction value is read out from the memory 87 using the decoded data as an address. The adding circuit 88 adds the correction value read out from the memory 87 to a code to be decoded, and outputs it to the decoding circuit 89. The decoding circuit 89 decodes this signal. In the above description, information to be input to the memory 87 as an address is the decoded data. The decoded data are represented with a smaller number of bits than data before decoded, so that the number of addresses of the memory 87 can be reduced. Therefore, the construction of this invention can be designed using a memory 87 whose scale can be sufficiently realized using a present LSI technique (in this embodiment, since each edge is varied in eight levels (stages), the data after decoded are represented with 3 bits for each edge. On the other hand, the data before decoded are represented with 8 bits for each edge.

Further, in the information recording medium thus constructed, the initial values are collectively recorded in the initial value setting data area 1B, so that the correction values can be accurately and correctly recorded.

BRIEF DESCRIPTION OF THE DRAWINGS

FIG. 39 is a table showing pits to be recorded in the initial value setting data area of the optical disc shown in FIG. 38; and FIG. 40 is a block diagram showing the construction of an embodiment of an optical disc manufacturing apparatus.

DETAILED DESCRIPTION OF THE PREFERRED EMBODIMENTS

Preferred embodiments according to this invention will be described hereunder with reference to the accompanying drawings.

Figure 1:
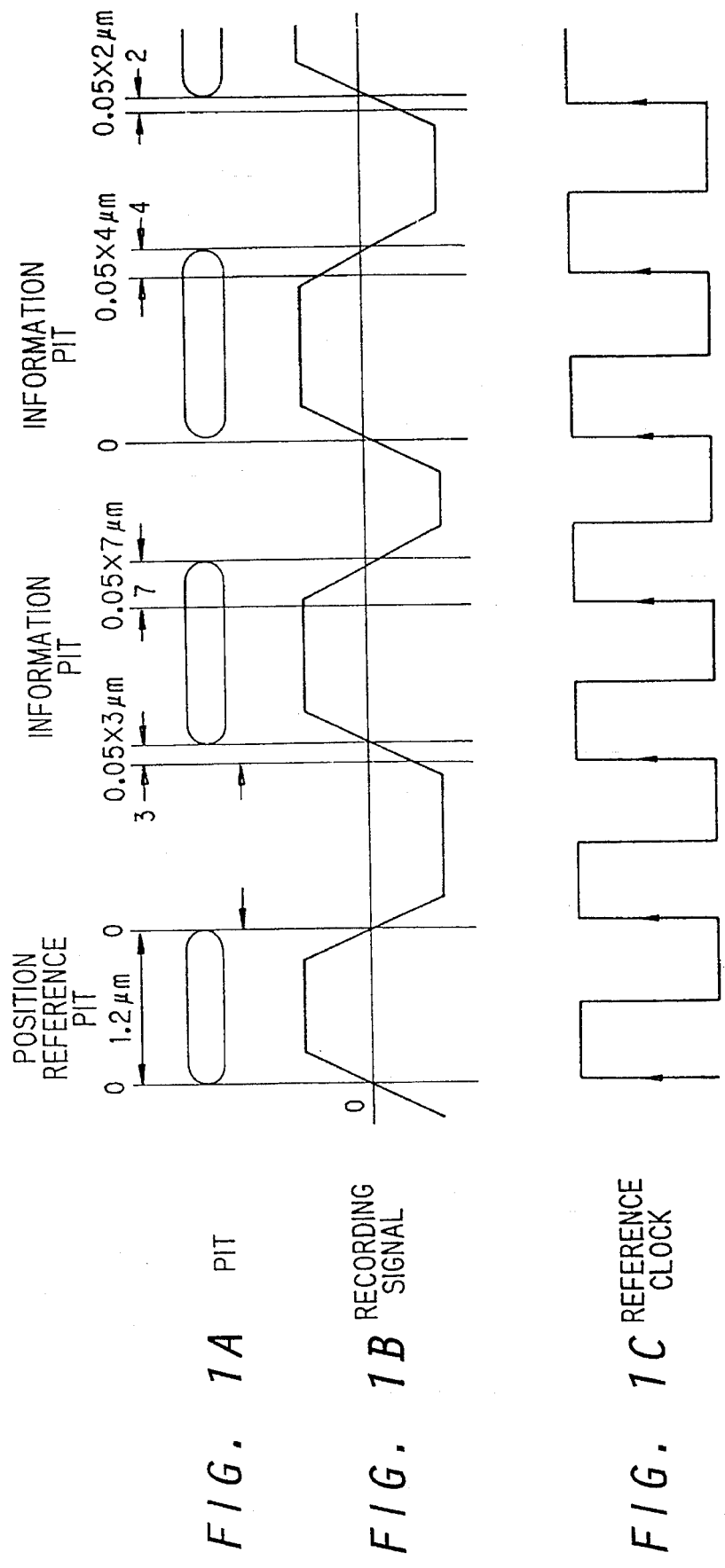
FIG. 1 is an explanatory diagram showing the principle of varying the edge position of a pit in accordance with recording data to record the data.
Figure 2:
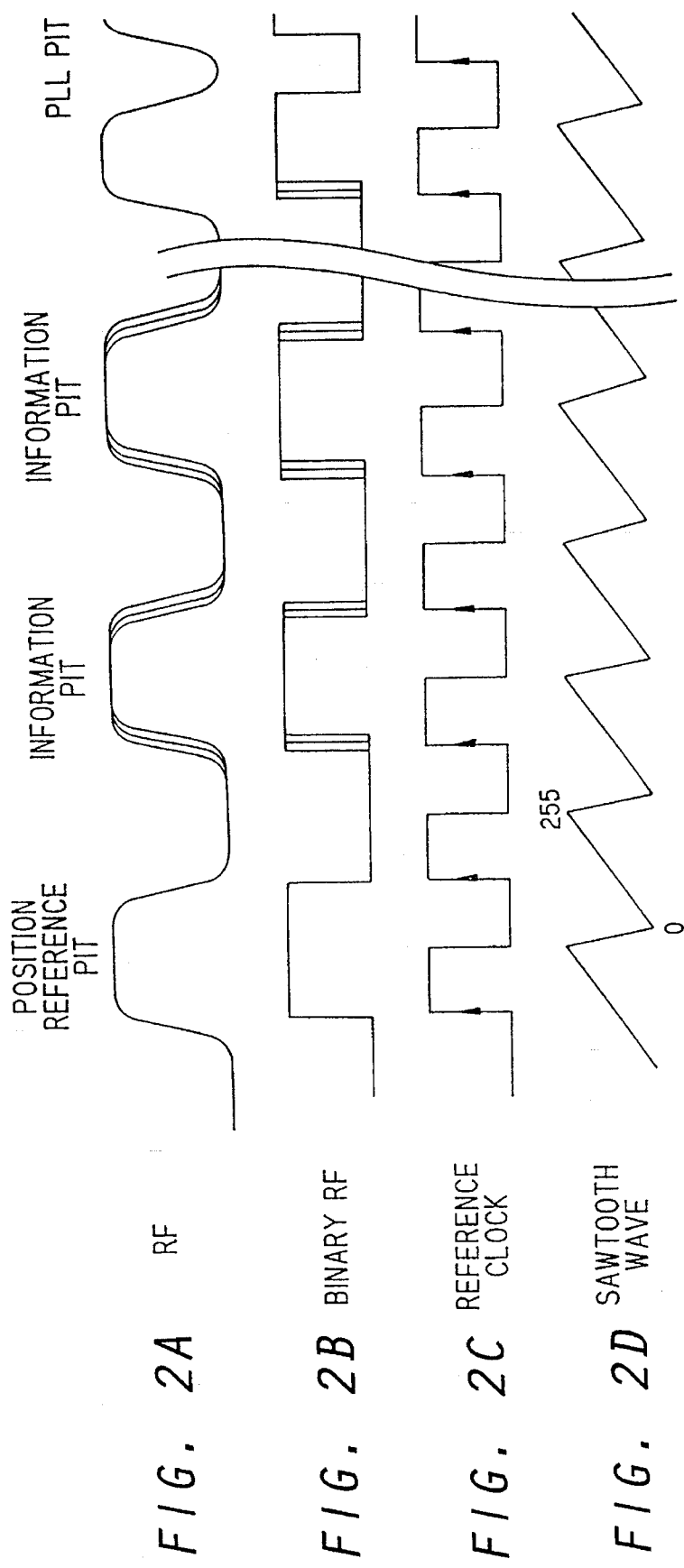
FIG. 2 is an explanatory diagram showing the principle of reproducing pits which are recorded while the edge positions thereof are stepwise.
Figure 3:
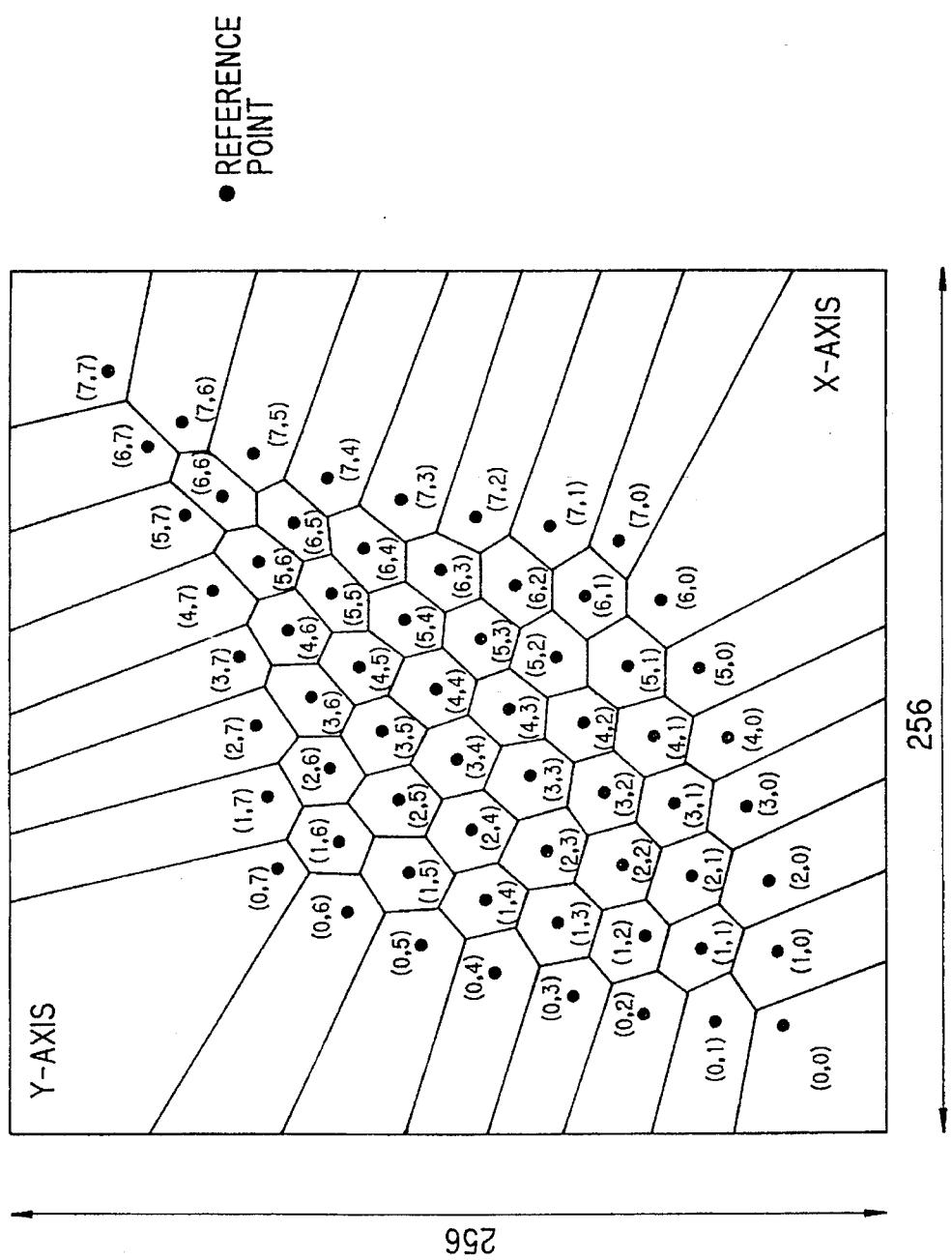
FIG. 3 is an explanatory diagram showing the principle of mapping reproduced signals shown in FIG. 2 and decoding the signals.
Figure 4:
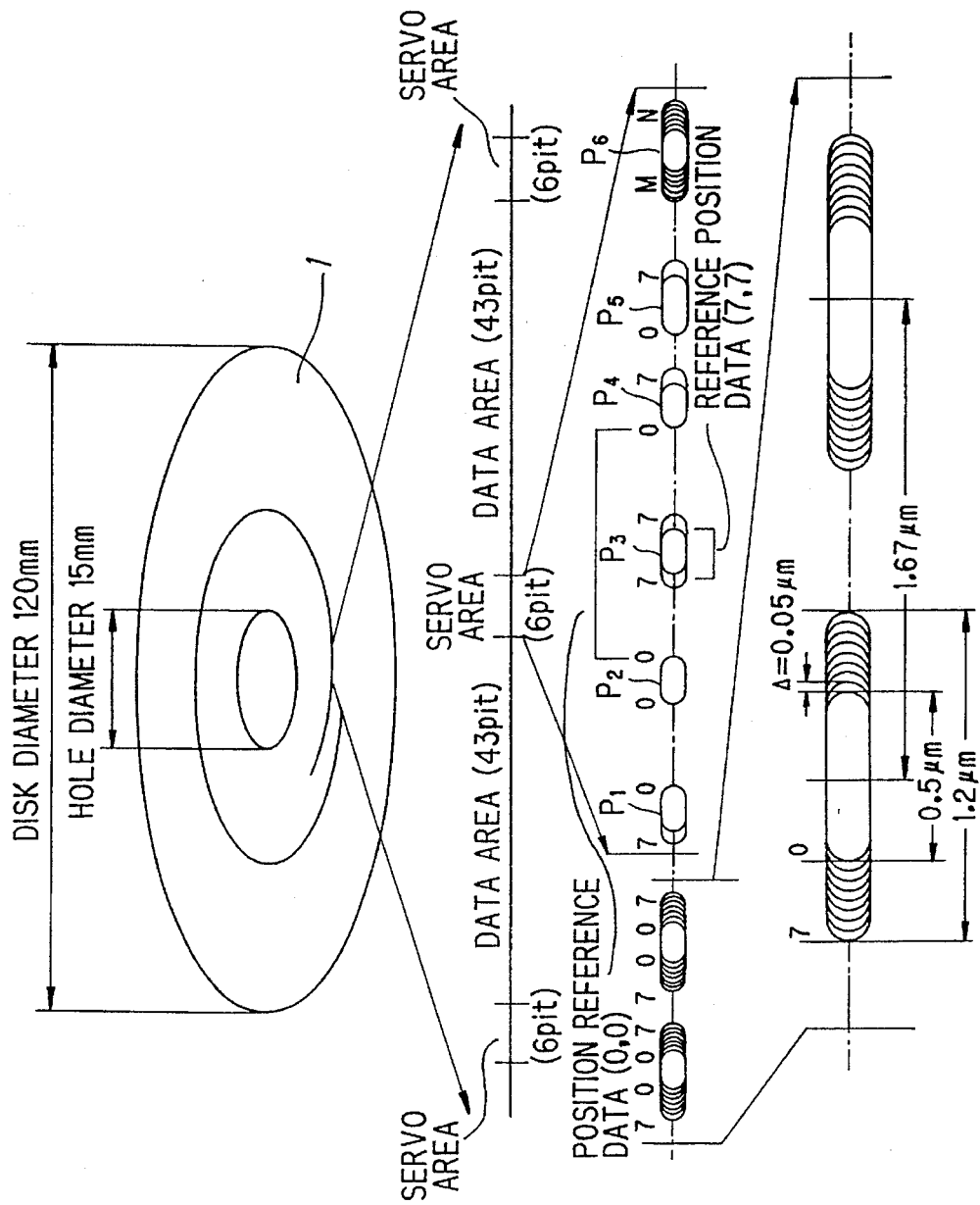
FIG. 4 is a schematic diagram showing a format in a servo area of an optical disc.

FIG. 4 shows a basic format of an optical disc from which information is reproduced by the information reproducing apparatus of this invention.

In this embodiment, a pit array (rows of pits) is recorded at a track pitch of 1.6 μm in the CLV mode on a reflection type of optical disc having 120 mm diameter (in which pits are formed as physical recess or projecting portions on a reflection surface of the optical disc). All information is recorded by shifting, stepwise in eight levels, the edge position of the front end (leading edge) and the rear end (trailing edge) of each of the pits which are disposed at a constant periodical interval of 1.67 μm, that is, each information is represented by a shift amount in edge position, which corresponds to any one of the eight-level variations of the leading edge and the trailing edge of each pit. An unit shift amount $\Delta$ (a shift amount corresponding one-level variation) is set to 0.05 μm. Accordingly, the pit length of each pit is varied from 0.5 μm (minimum pit length) to 1.2 μm (maximum pit length) every 0.05 μm as shown in FIG. 4.

In accordance with the 8-level shift amount of the edge position of each of the pits thus arranged, 3-bit digital information can be recorded for each pit, and thus a line recording data density in a pit array direction is equal to 0.28 μm/bit. This value is two or more times as large as the present CD system.

In the CD system, even when the linear velocity is set to its upper limit value of 1.2 m/s, 8-bit data bits are converted to totally 17-bit channel bits comprising 14-bit information bits and 3-bit margin bits through EFM (Eight to Fourteen Modulation), and recorded on pits of the disc. Accordingly, considering the EFM, the linear recording data density is equal to about 0.6 μm/bit. That is, the shortest pit of about 0.9 μm corresponds to three channel bits, and thus (0.9/3)×(17/8)=about 0.6 μm/bit.

Figure 5:
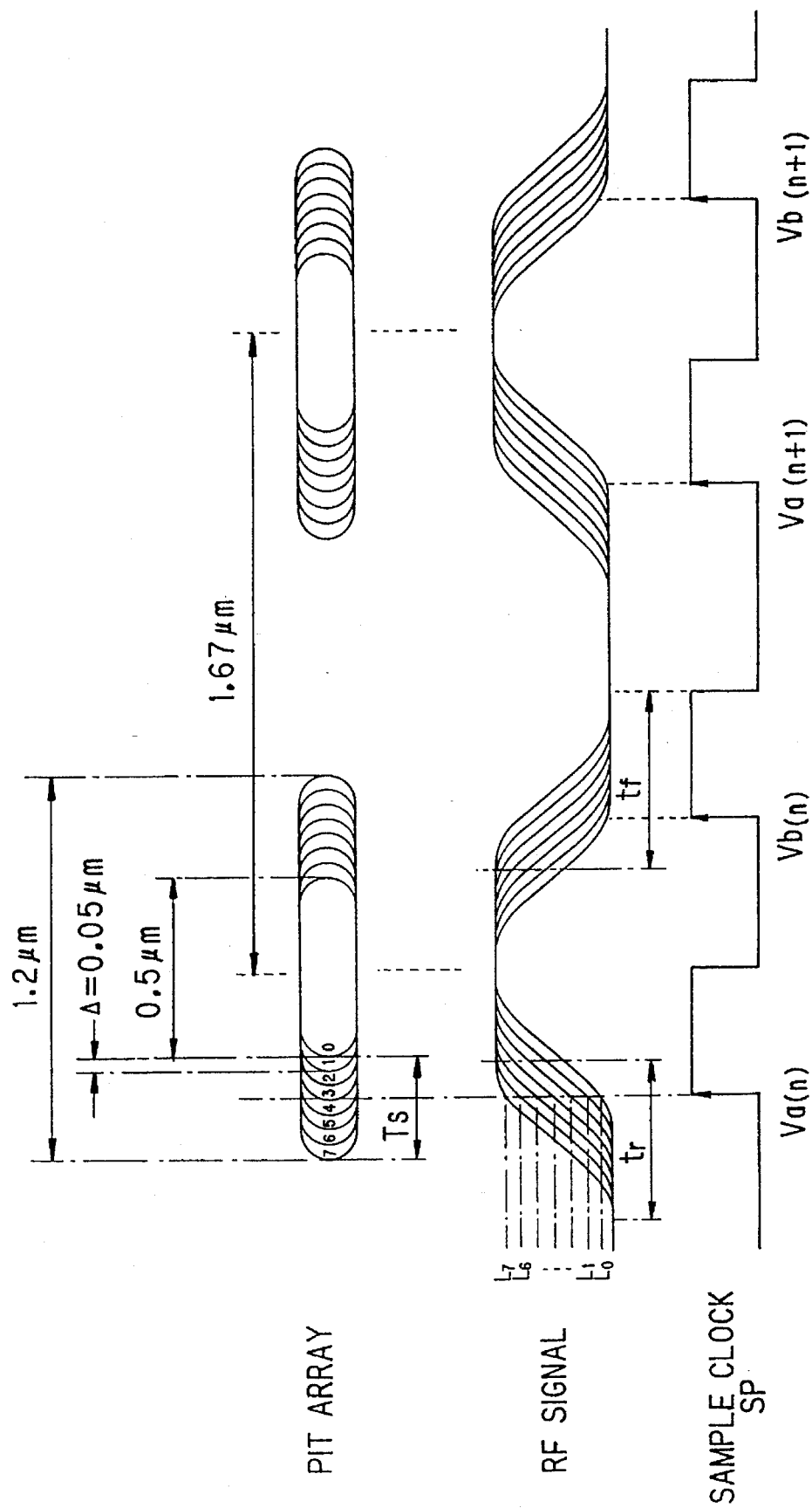
FIG. 5 is an explanatory diagram showing the principle of reproducing data.

Here, as shown in FIG. 5, the edge position of a pit recorded on the optical disc 1 is stepwise varied from its reference position at the center thereof in accordance with digital information to be recorded, and a shift period Ts ($=\Delta X7$) is set within a period which is smaller than the rise-up period tr or the fall period tf each of which corresponds to a transient period of an RF signal (reproduced signal) (i.e., a period other than a stationary state in which the RF signal is in zero level or saturated level) which is determined by transfer characteristics of the optical detection system.

The RF signal as described above is output from a pickup 3 of a reproducing apparatus as described later, and the transient period is determined on the basis of the transfer characteristic of the pickup 3. Generally, the transfer characteristic of the optical system is defined by MTF (Modulation Transfer Function) which is the absolute value of its transfer function (OTF: Optical Transfer Function), and the MTF is dependent on the numerical aperture of a lens and the wavelength $\lambda$ of a laser.

By shifting the edge position on the basis of a unit shift amount $\Delta$ smaller than 0.05 μm for the shift period Ts, the recording density can be further improved.

The RF signal is subjected to the A/D conversion, for example, at the timing of the leading edges of sample clocks SP which are synchronized in phase with the reference positions at the centers of the pit recorded in the above manner, thereby obtaining reproduction levels L0 to L7 which correspond to the shift amounts 0 to 7 of the edge position of each pit. The condition that the reproduction levels L0 to L7 can be detected by sampling the reproduced signal only once within the transient period tr or tf of the RF signal as described above is as follows:

Shift period Ts≦Transient period (rise-up period tr or fall period tf). The sampling timing with the sample clocks SP is preferably set to a timing corresponding to the center of the shift period Ts as shown in FIG. 5, and using this timing, the reproduction levels can be detected over the whole range of the transient period of the RF signal.

In this embodiment, the disc comprises a reflection type of optical disc having pits formed as physical recess or projecting portions on the reflection surface thereof. However, this invention is also applicable to a so-called MO (Magneto-Optical) disc or the like on which pits (marks) are formed by partially inverting magnetization on a magnetooptical film.

Figure 6:
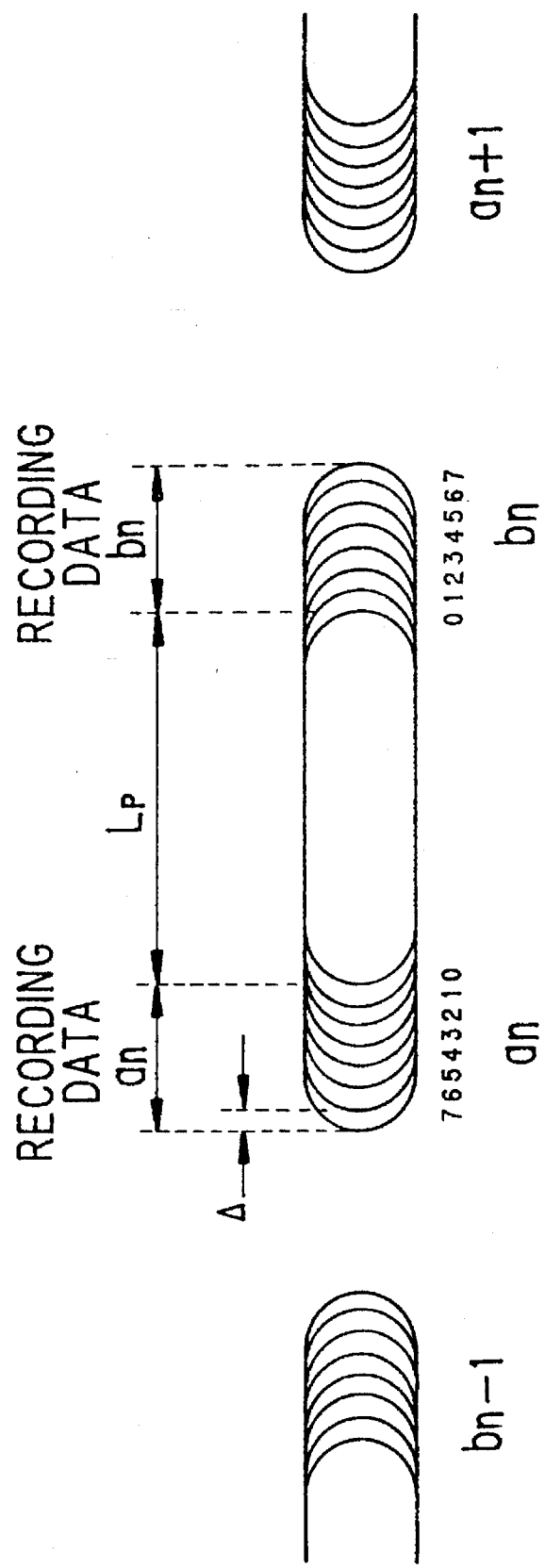
FIG. 6 is an enlarged view of pits on the optical disc of FIG. 4 in which the edges of the pits are stepwise varied.

The digital information recorded on the optical disc 1 is cut out every three bits, and recorded as recording data an and bn in an n-th pit. FIG. 6 shows the recording state as described above. The front-end edge (leading edge) of the pit is set to any one of eight shift positions from "0" to "7" in accordance with the recording data an. Likewise, the rear-end edge (trailing edge) of the pit is set to any one of eight shift positions from "0" to "7". As described above, the shift pitch $\Delta$ between the shift positions is set to 0.05 μm.

Therefore, the length L of each pit is set to the minimum length P=0.5 μm when the recording data an and bn are formed at the edges of the shift position "0".

Returning to FIG. 4, on the optical disc 1, a servo area comprising six servo pits P1 to P6 is inserted between two data areas each comprising 43 data pits formed in accordance with the recording data. The pit P6 of the six pits recorded in the servo area is set as an educational pit, and the pits P1 to P5 are set as reference pits. The front-end edge at the left side of the educational pit P6 in FIG. 4 is set to any one position M of eight-level shift positions from "0" to "7", and the rear-end edge at the right side of the educational pit P6 is also set to any one position N of eight-level shift positions from "0" to "7".

The combination of the positions M and N of the front-end and rear-end edges of the educational pit P6 is determined according to a rule so as to be different between respective servo areas. That is, the combination (M,N) of the positions M and N is set to (0,0) for a first servo area, and set to (0,1) for a second servo area. Likewise, the combination (M,N) is set to (0,2), (0,3), ... , (7,6), (7,7) for subsequent servo areas according to the rule. With this arrangement, all possible positional combinations of the front-end edge and the rear-end edge of the educational pit P6 can be detected by reproducing the servo areas of 64 (=8×8).

The reference pits P2 to P4 are used to obtain data at the reference positions (0,0) and (7,7). The reference position data can be theoretically formed at both end edges of the pit P1 or P5, for example. However, in this case, a rate of interference between neighboring data areas is varied in accordance with recording data, and thus the reference position data are preferably formed in the pits P2 to P4 between the dummy reference pits P1 and P5 (whose data are fixed at all times).

In addition, if an edge used as a clock generation reference is set to any edge between the reference pits P1 to P5, it suffers no effect by the recording data, and thus the clock can be accurately generated.

Figure 7:
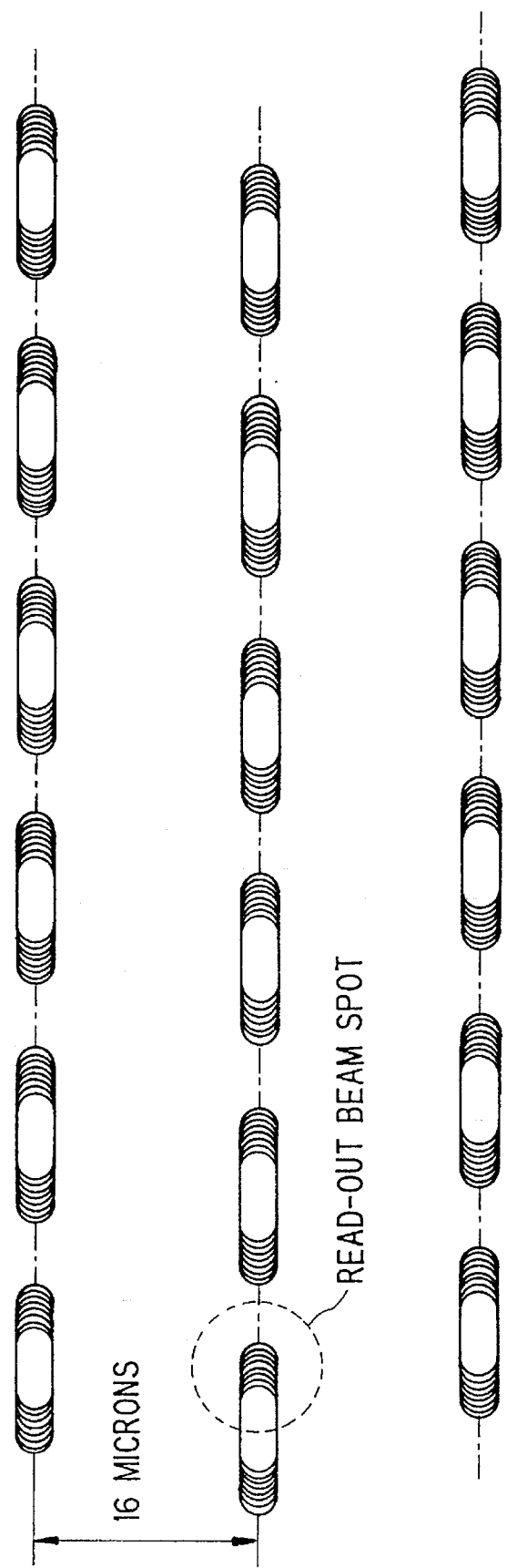
FIG. 7 is a schematic view showing a pit arrangement of neighboring tracks when the optical disc of FIG. 4 is a CLV disc.

FIG. 7 is a schematic view showing the plan construction of the optical disc 1. Signals which are recorded at a track pitch of 1.6 μm on a disc are recorded in the CLV mode, so that the pit positions on neighboring tracks are out of phase, and these signals are recorded on the disc at irregular phase.

Figure 8:
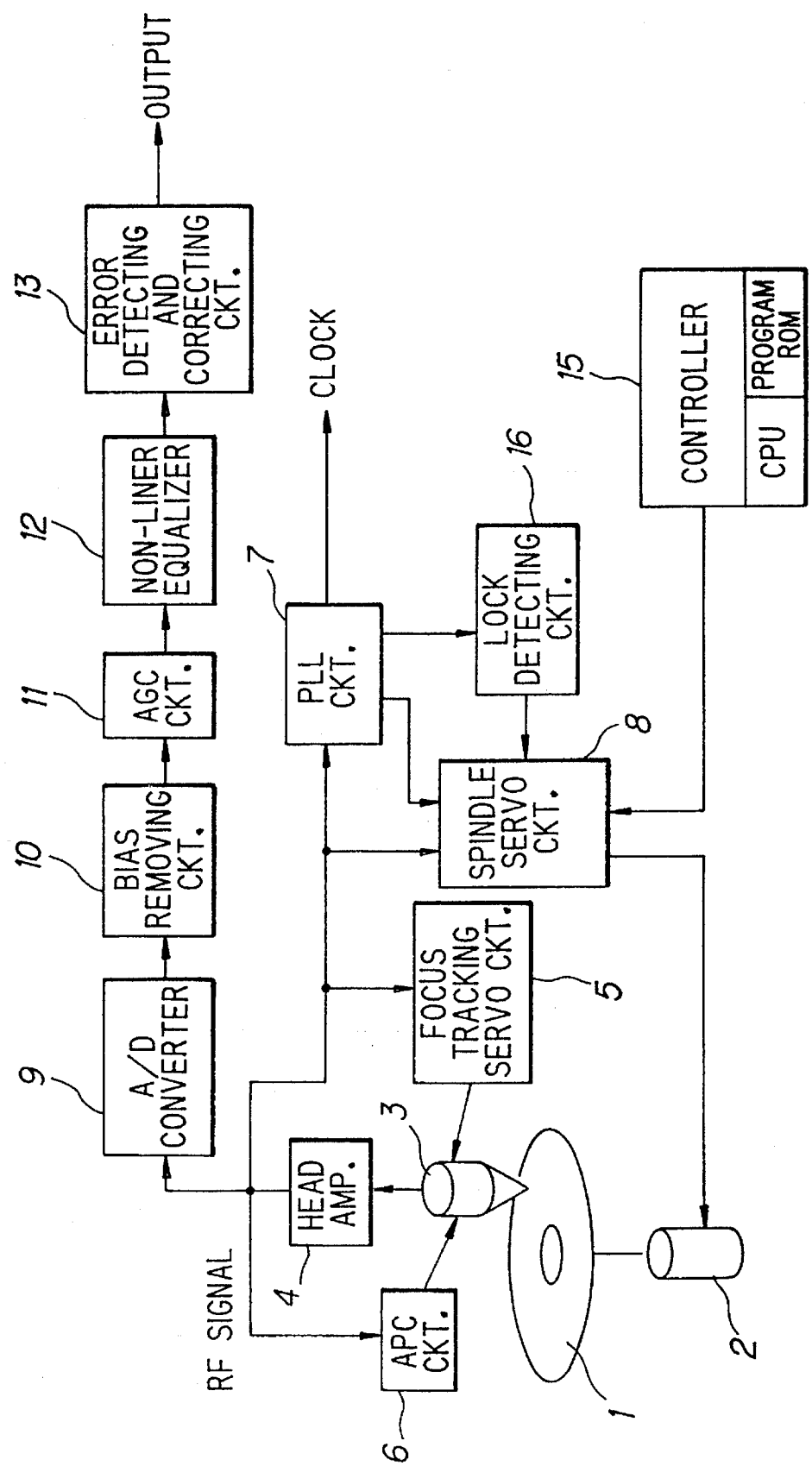
FIG. 8 is a block diagram showing the construction of an embodiment of an optical reproducing apparatus to which the information reproducing apparatus of this invention is applied.

FIG. 8 is a block diagram showing an embodiment of an optical disc reproducing apparatus to which the information reproducing apparatus of this invention is applied.

The optical disc 1 is rotated by a spindle motor 2. Digital information is recorded on the optical disc 1 on the basis of the principle shown in FIGS. 4 and 5. That is, the digital information is recorded by stepwise shifting at least one position of the front-end and rear-end edges of each pit from a predetermined reference position. Servo areas are formed at a fixed period on the optical disc 1, and the reference pits P1 to P5 and the educational pit P6 are formed in each servo area. It is needless to say that data pits are formed in the data areas.

The pickup 3 serves to irradiate a laser beam onto the optical disc 1, and signals recorded on the optical disc 1 are reproduced on the basis of light reflected from the optical disc 1. The RF signals output from the pickup 3 are amplified by a head amplifier 4, and supplied to a focus tracking servo circuit 5, an APC circuit 6, a PLL circuit 7 and a spindle servo circuit 8.

The focus tracking servo circuit 5 generates a focus signal and a tracking error signal from a signal input thereto, and executes a focus control and a tracking control in accordance with an error signal. The APC circuit 6 executes a servo control so that the power of the laser beam irradiated onto the optical disc 1 is constant.

The PLL circuit 7 extracts clock components from an input signal thereto. A PLL circuit which is used in an ordinary CD system reproduces clocks using all RF signals, however, in this embodiment, the clocks are reproduced using only the RF signals in the servo areas. Accordingly, the pits in the servo areas are not modulated by the recording data, and thus the RF signals has no effect from the recording data. Therefore, in this embodiment the clock reproduction can be stably performed.

The spindle servo circuit 8 controls the spindle motor 2 so that the optical disc 1 is rotated at a constant linear velocity.

On the other hand, the RF signals output from the head amplifier 4 are input to the A/D converter 9 to be A/D-converted to digital data (reproduction levels) representing 258-gradation levels of 8 bits at the rise-up timing (the timing of the leading edges) of the sample clocks SP. The 8-bit data are supplied to a bias removing circuit 10 to remove a bias component from the data, and then input to an automatic gain control (AGC) circuit 11 to control the gain thereof. The output of the AGC circuit 11 is input to an error detecting and correcting (ECC) circuit 13 through a non-linear equalizer 12. The error detecting and correcting circuit 13 detects errors of the input data and corrects the errors, and then outputs the corrected data to an analog audio amplifier through a D/A converter (not shown), for example.

A controller 15 comprises a CPU for executing various kinds of calculations, a program ROM for storing programs which are executed by the CPU, etc., and it controls operations of the spindle servo circuit 8 and other circuits.

Figure 9:
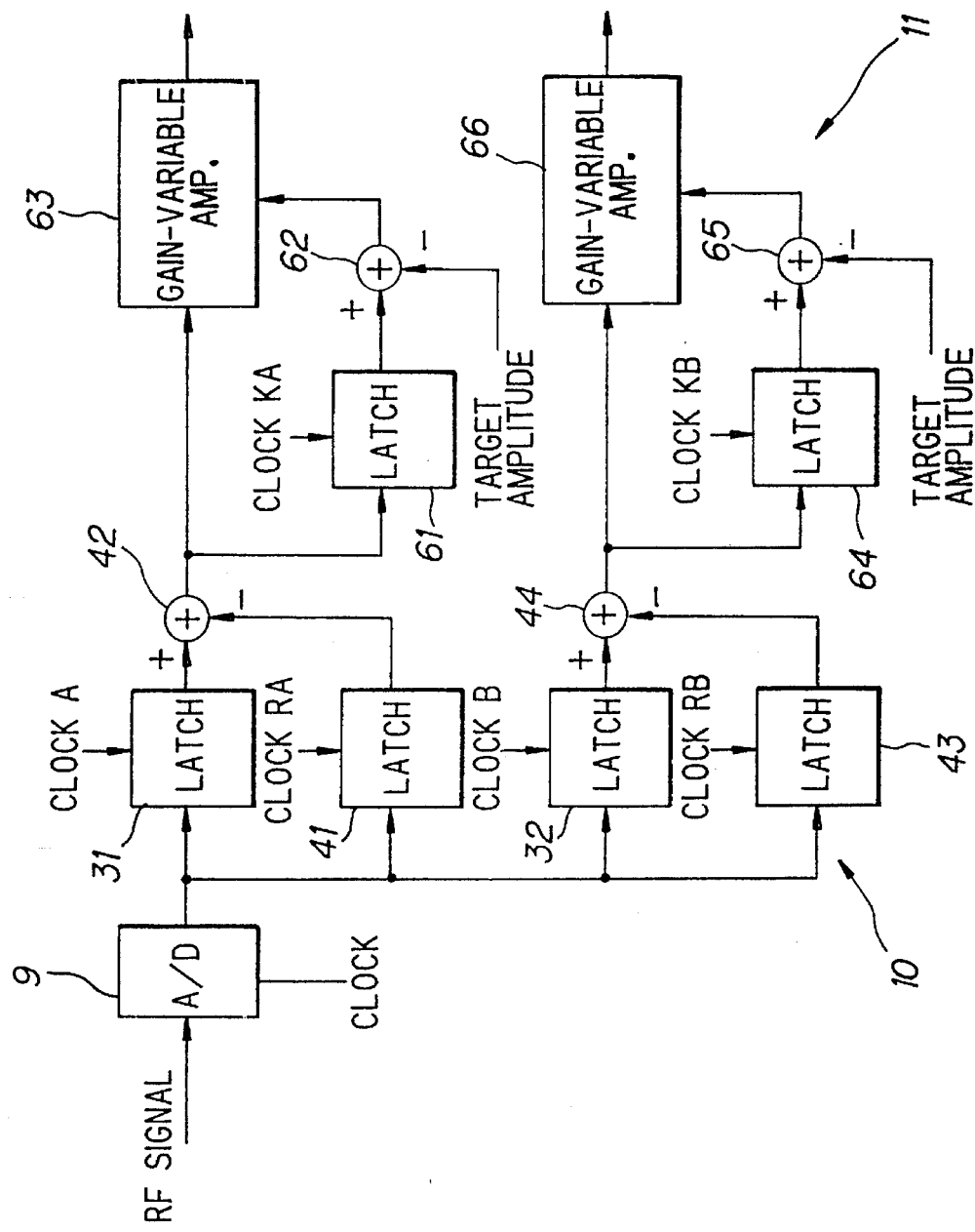
FIG. 9 is a block diagram showing the construction of a bias removing circuit 10 and an AGC circuit 11.

FIG. 9 is a block diagram showing the construction of the bias removing circuit 10 and the AGC circuit 11. The bias removing circuit 10 includes latch circuits 31, 32, 41 and 43 for latching the output of the A/D converter 9, a subtracting circuit 42 for subtracting the output of the latch circuit 41 from the output of the latch circuit 31, and a subtraction circuit 44 for subtracting the output of the latch circuit 43 from the output of the latch circuit 32.

The AGC circuit 11 includes a latch circuit 61 for latching the output of the subtraction circuit 42, a subtraction circuit 62 for subtracting a prescribed target amplitude from the output of the latch circuit 61, a gain-variable amplifier 63 for controlling the output level of the subtraction circuit 42 in accordance with the output of the subtraction circuit 62, a latch circuit 64 for latching the output of the subtraction circuit 44, a subtraction circuit 65 for subtracting a prescribed target amplitude from the output of the latch circuit 64, and a gain-variable amplifier 66 for controlling the output level of the subtraction circuit 44 in accordance with the output of the subtraction circuit 65.

The gain-variable amplifiers 63 and 66 may be constructed by a ROM. In this case, the outputs of the subtracting circuits 42 and 62 (44 and 65) are input as an address to the ROM, and data corresponding to the address are read out.

Figure 10:
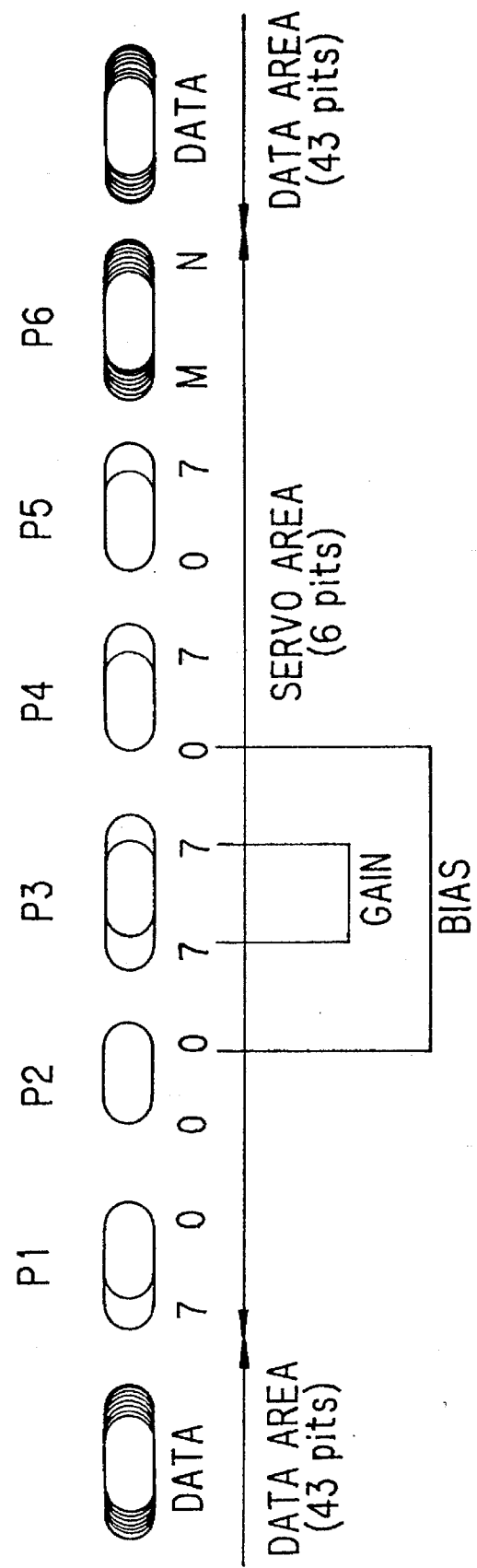
FIG. 10 is an enlarged view of pits in a servo area which are recorded on the optical disc of FIG. 4.
Figure 11:
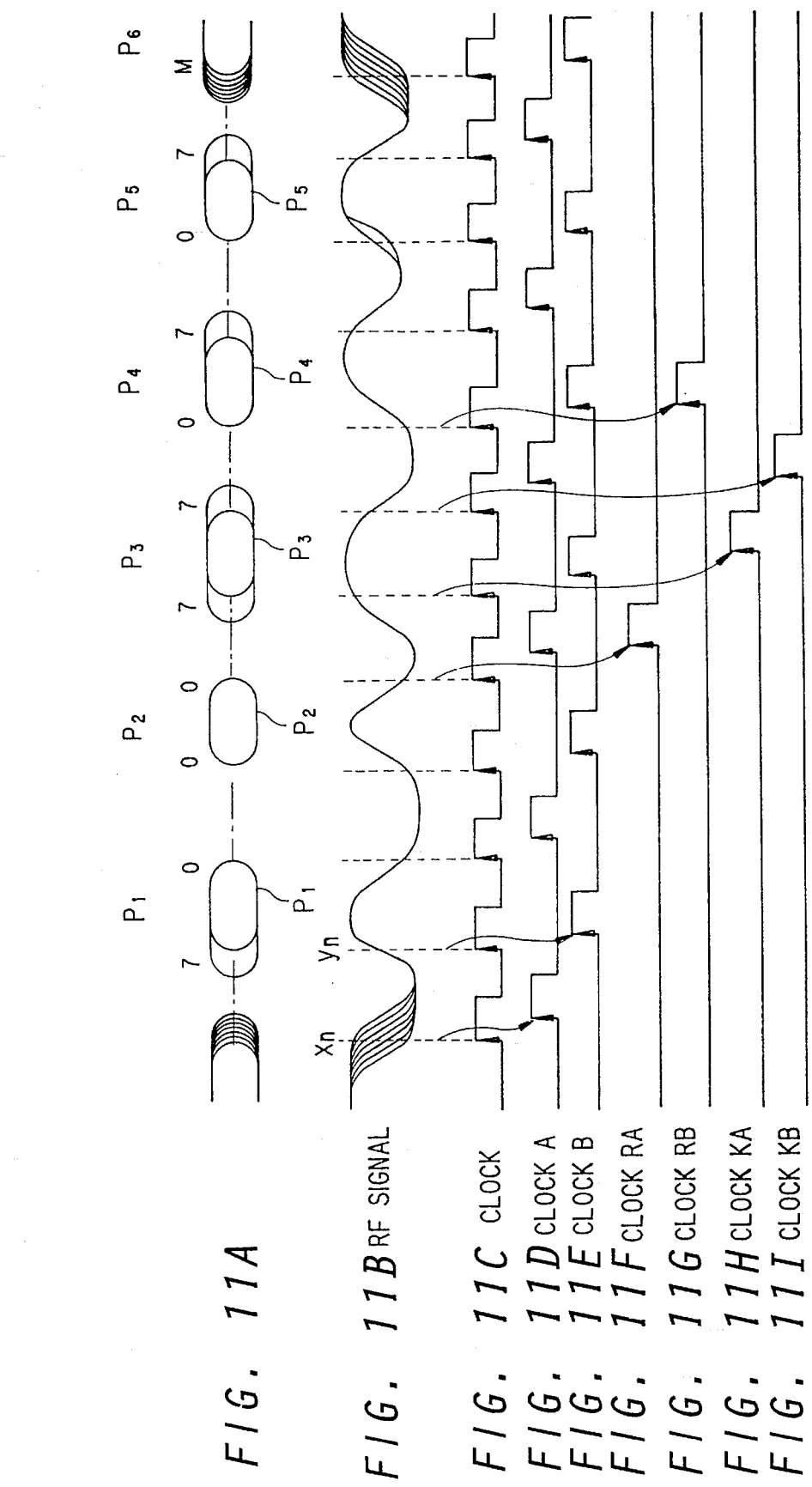
FIG. 11 is a timing chart showing an operation of the embodiment of FIG. 9.

Next, the operation of the embodiment shown in FIG. 9 will be described with reference to FIG. 10 showing a pattern of a servo area and FIG. 11 showing a time chart. As shown in FIG. 10, a reference position data "0" is recorded at the rear end of the reference pit P2 and the front end of the reference pit P4 as shown in FIG. 10. Further, a reference position data "7" is recorded at the front and rear ends of the reference pit P3.

The data pits, the reference pits and the educational pits shown in FIGS. 10 and at a top (first) stage of FIG. 11 are reproduced to obtain an RF signal shown in FIG. 11. The RF signal is input to the A/D converter 9 to be converted to digital data at the timing of a clock which is shown at a third stage of FIG. 11. That is, the A/D converter 9 samples the level corresponding to the front-end and rear-end edges of each pit.

The latch circuit 31 latches the output of the A/D converter 9 in accordance with a clock A shown at a fourth stage of FIG. 11. The clock A is generated at a timing at which data at the rear-end edge of each pit is latched. Accordingly, the data corresponding to the rear-end edge of each pit is latched in the latch circuit 31. Further, the latch circuit 41 latches the output of the A/D converter 9 by a clock RA shown at a sixth stage of FIG. 8. The clock RA is generated at a timing at which a reference position data "0" at the rear end of the reference pit P2 is latched, and thus the reference position data "0" of the rear end of the reference pit P2 is latched in the latch circuit 41. The subtraction circuit 42 subtracts the reference position data "0" of the rear end latched by the latch circuit 41 from the data of the rear-end edge of each pit which is latched by the latch circuit 31.

Likewise, the data corresponding to the front-end edge of each pit is latched at the timing of a clock B shown at a fifth stage of FIG. 11 in the latch circuit 32, and the reference position data "0" of the front end of the reference pit P4 is latched at the timing of a clock RB shown at a seventh stage of FIG. 11. The subtraction circuit 44 subtracts the reference position data "0" of the front-end edge latched by the latch circuit 43 from the data of the front-end edge of each pit latched by the latch circuit 32.

As described above, by subtracting the data at the position "0" from the data corresponding to the edge position of each pit as described above, the DC components (bias components) can be removed from the reproduced signals. Through this operation, even when the reproduction level (absolute level) corresponding to a shift position of the edge of each pit is varied, the correct shift position can be accurately judged.

The output of the subtraction circuit 42 is latched at the timing of a clock KA shown at an eighth stage of FIG. 11 in the latch circuit 61. That is, the reference position recorded at the front-end edge of the reference pit P3 is latched in the latch circuit 61. A target amplitude which is beforehand set in the subtraction circuit 62 is subtracted from the output of the latch circuit 61, and the difference therebetween is supplied to the gain-variable amplifier 63.

The gain-variable amplifier 63 adjusts the gain of the signal supplied from the subtraction circuit 42 in accordance with the signal supplied from the subtraction circuit 62. That is, through this operation, the level of the reference position data 7 of the signal which is output from the gain-variable amplifier 63 is set to the target amplitude.

Likewise, the output of the subtraction circuit 44 is latched at the timing of a clock KB shown at a ninth stage of FIG. 11 in the latch circuit 64. That is, the reference position data recorded at the rear-end edge of the reference pit P3 is latched in the latch circuit 64. The data latched by the latch circuit 64 is input to the subtraction circuit 65 to subtract the target amplitude therefrom, and then supplied to the gain-variable amplifier 66.

The gain-variable amplifier 66 adjusts the gain of the signal supplied from the subtraction circuit 44 in accordance with the signal supplied from the subtraction circuit 65. That is, through this operation, the level of the reference position data "7" of the signal which is output from the gain-variable amplifier 66 is adjusted to be the target amplitude which is beforehand set.

As described above, by adjusting the gain with the AGC circuit 11, the data can be accurately read out even when any dispersion in characteristic exists locally on the optical disc 1.

Figure 12:
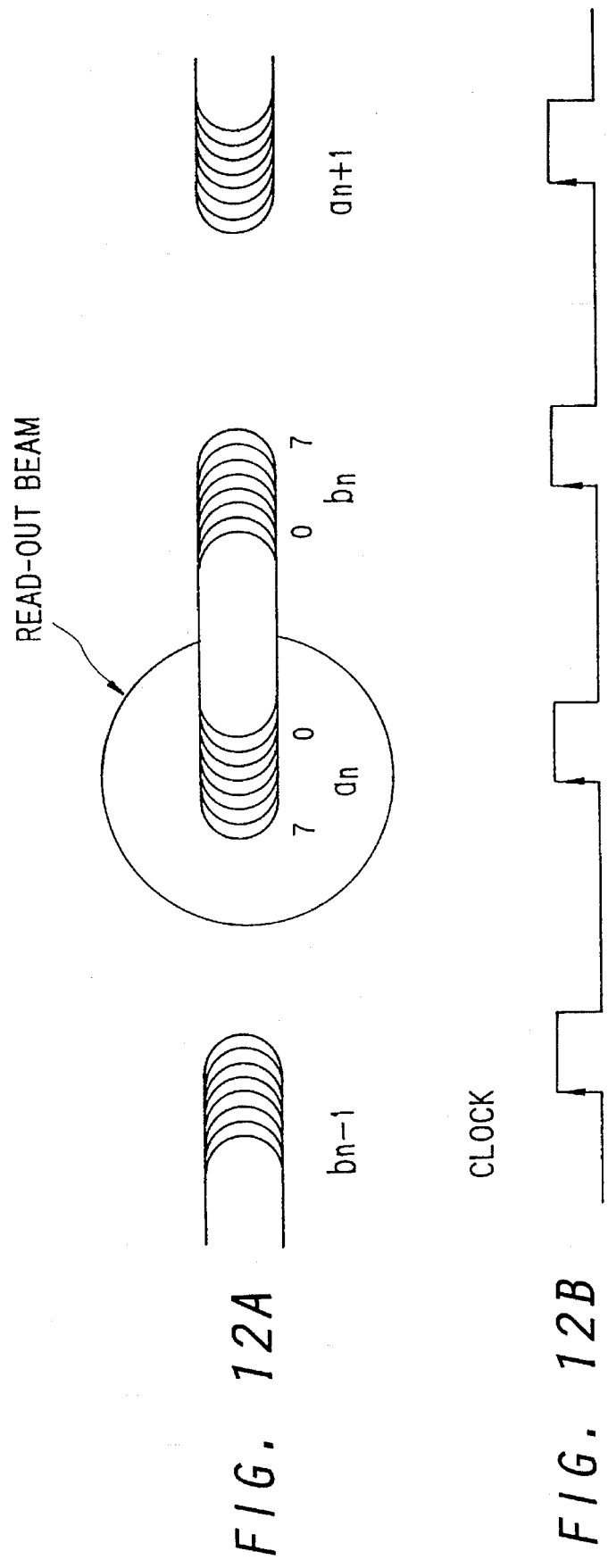
FIG. 12 is a schematic view showing a phase relationship between a read-out beam and a clock.

FIG. 12 shows relationship between the relative position of a read-out beam spot and a pit and a clock reproduced from the servo area. As shown in FIG. 12, clocks which are generated in synchronism with the timing of prescribed edges in a servo area are adjusted so that the leading edges thereof occur when the spot of the read-out laser beam arrives at the edge portions of the front end and the rear end of each pit. As described above, the reproduction level is sampled at this rise-up timing in the A/D converter 9.

Now, representing the level of a reproduced signal obtained for the front-end edge of a pit by Va(n) and representing the level of a reproduced signal obtained for the rear-end edge by Vb(n), the following equations would be satisfied in an ideal state where there exist no intersymbol interference and no non-linearity of a transmission path:

$$Va(n)=\Delta r \cdot an+C \qquad (1)$$

$$Vb(n)=\Delta r \cdot bn+C \qquad (2)$$

Here, an and bn represent recording data, and $\Delta r$ represents an amount proportional to a variation (shift) unit $\Delta$ of the pit length on the optical disc 1. C and $\Delta r$ represent constants which are determined by the bias removing circuit 10 and the AGC circuit 11.

Figure 13:
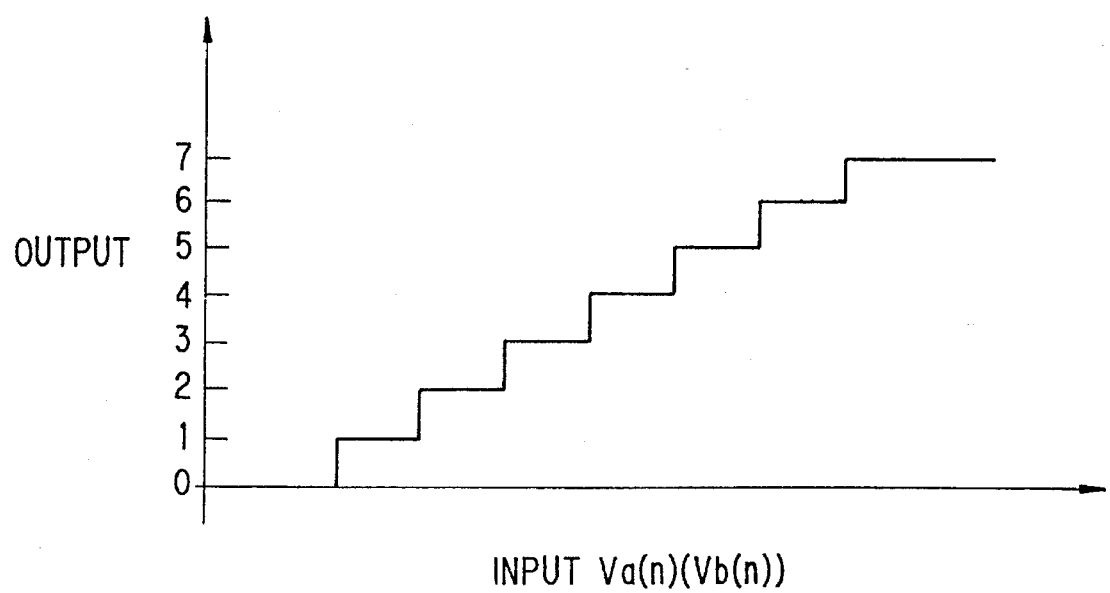
FIG. 13 is a graph showing an input/output characteristic of a decoding circuit.

The ideal reproduced signal as described above can be easily decoded using a decoding circuit having a stepwise input/output characteristic shown in FIG. 13. That is, this decoding circuit outputs any value of "0" to "7" when the reproduced signal level Va(n) or Vb(n) is in a predetermined range.

Figure 14:
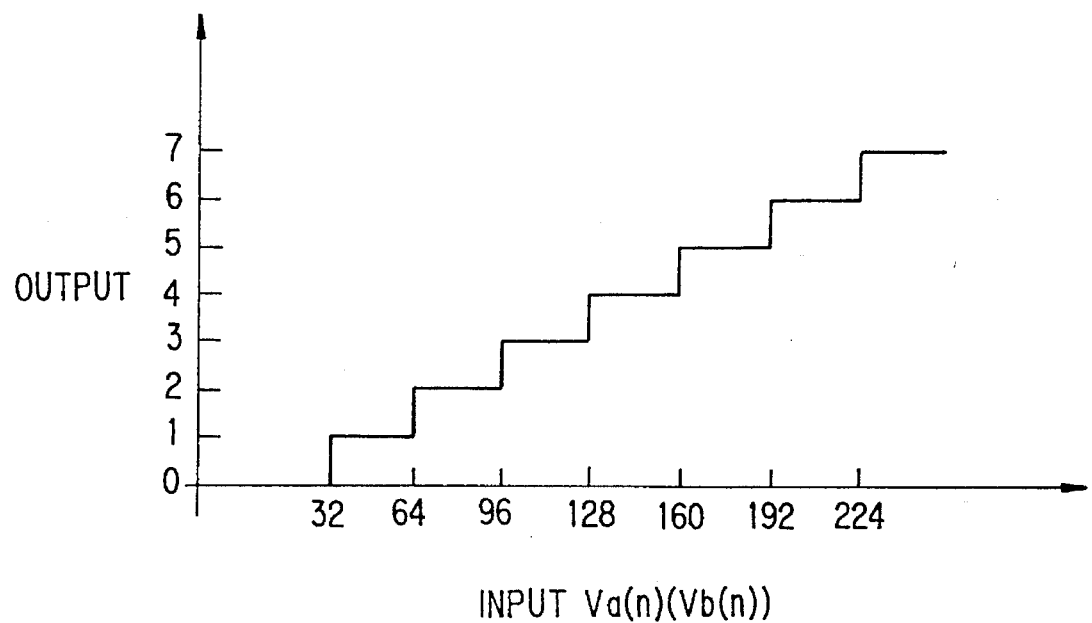
FIG. 14 is a graph showing an input/output characteristic of a decoding circuit.

For example, assuming that the bias removing circuit 10 and the AGC circuit 11 are adjusted so that $\Delta r=32$ and $C=16$, the threshold value of a range of the reproduced signal level Va(n) or Vb(n) is shown in FIG. 14.

In this case, the following decoding result is obtained: "0" for the reproduction level Va(n) or Vb(n) from "0" to "32", "1" for the level from "32" to "64", "2" for the level from "64" to "96", "3" for the level from "96" to "128", "4" for the level from "128" to "160", "5" for the level from "160" to "192", "6" for the level from "192" to "224", and "7" for the level above "224". The decoding circuit 70 having such a characteristic can be designed as shown in FIG. 15, for example.

That is, in this embodiment, the reproduction level Va(n) or Vb(n) is set as 8-bit digital data from ID7 to ID0, and the decoding result thereof is output as 3-bit digital data from OD2 to OD0. ID7 and ID6 are directly set to OD2 or OD1. Data obtained by inverting ID4, ID3 and ID2 in inverters 71 to 73 and the logical product of ID6 and ID7 are subjected to an AND operation in an AND circuit 75. The output of the AND circuit 75 and data obtained by inverting ID5 in an inverter 74 are subjected to a NOR-operation in a NOR circuit 76 and the obtained value is set as OD0.

In this embodiment, the least significant 2-bit ID1 and ID0 at the input side serve as noise components, and has no effect on the output side, so that these are negligible.

Figure 15:
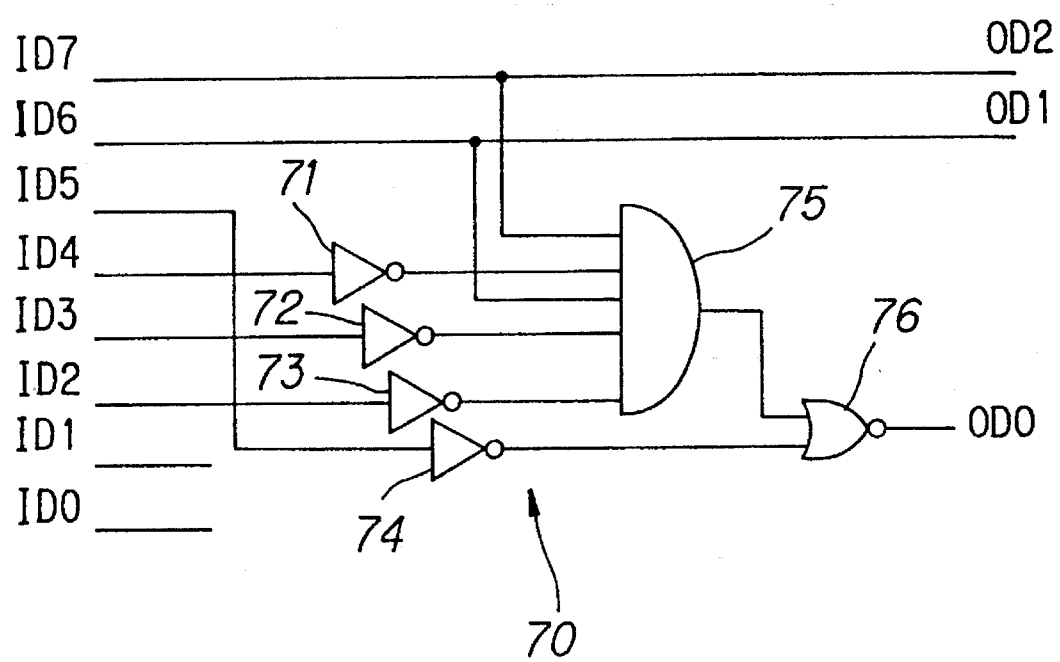
FIG. 15 is a schematic diagram showing the construction of a decoding circuit which realizes the characteristic of FIG. 14.
Figure 16:
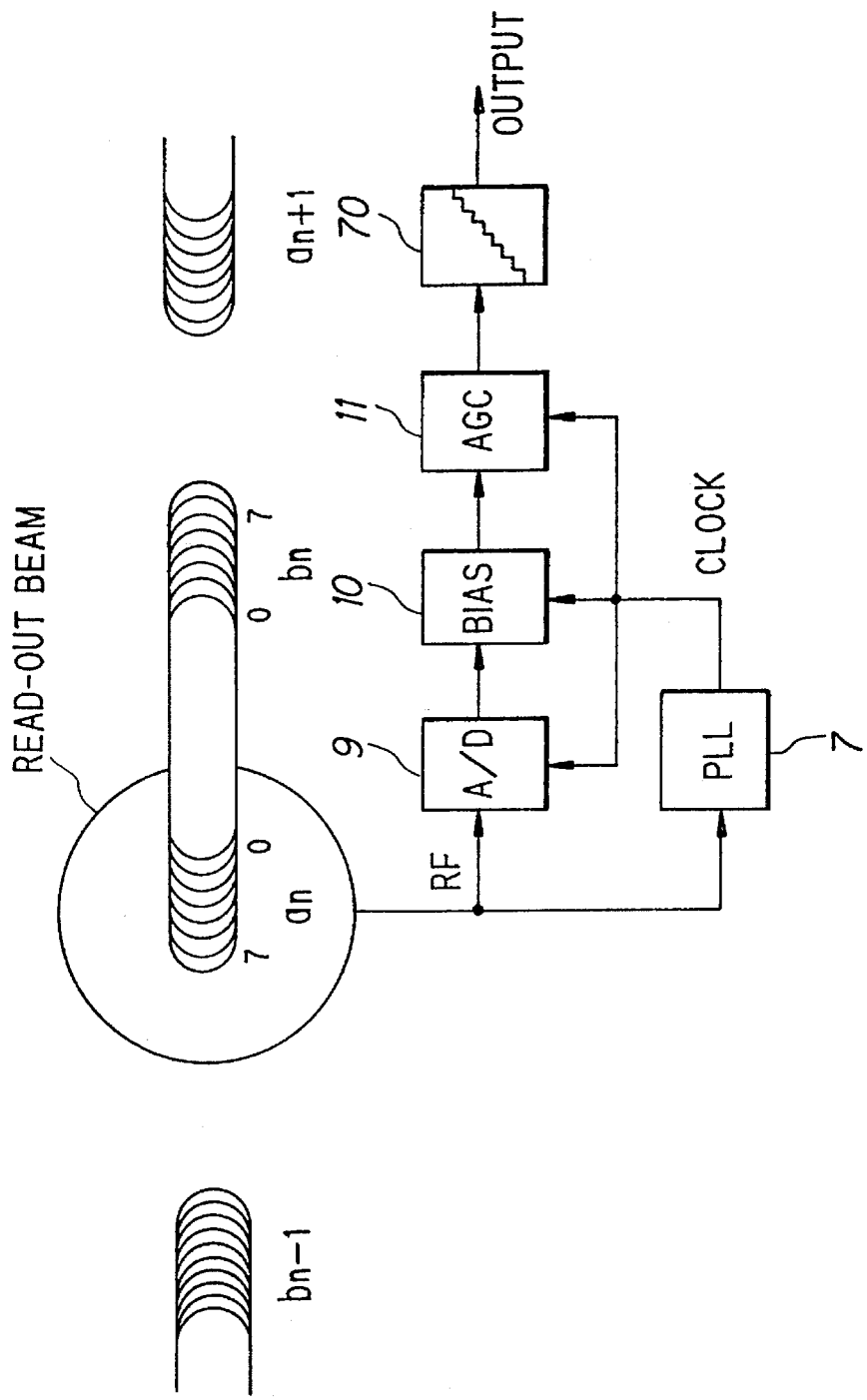
FIG. 16 is a block diagram showing the construction of a decoding device when there is no non-linear intersymbol interference.

As described above, in the case where the ideal reproduced signals represented by the equations (1) and (2) can be obtained, as shown in FIG. 16, the output of the AGC circuit 11 can be easily decoded using the decoding circuit 70 as shown in FIG. 15.

However, actually, any intersymbol interference occurs if data are recorded in high density and the distance between pits is short, and thus it is difficult to perform a correct decoding using the circuit as shown in FIG. 16. In view of the foregoing, as previously proposed by the applicant of this application in Japanese Patent Application No. 4-300470, it is considered that the amount of intersymbol interference is estimated prior to the recording to finely adjust the edge position of each pit so as to cancel the intersymbol interference. However, if a manufacturing condition for discs is finely varied, the size of pits are also finely varied, so that the state of the intersymbol interference is varied. Therefore, even using this method, it is difficult to accurately decode the data with the construction as shown in FIG. 16.

In view of the foregoing, it is also considered that data are two-dimensionally decoded by mapping two-point sample signals as previously proposed in Japanese Patent Application No. 5-20876. However, as described above, it takes a long time to learn reference points on which the mapping is performed, and thus is difficult to use this method in a case where the intersymbol interference is varied at high speed with rotation of an optical disc, like a case where any skew exists. Further, as described above, in order to remove the intersymbol interference due to pit edges which are located far away, the circuits must be designed in a large scale, and this is practically impossible.

Figure 17:
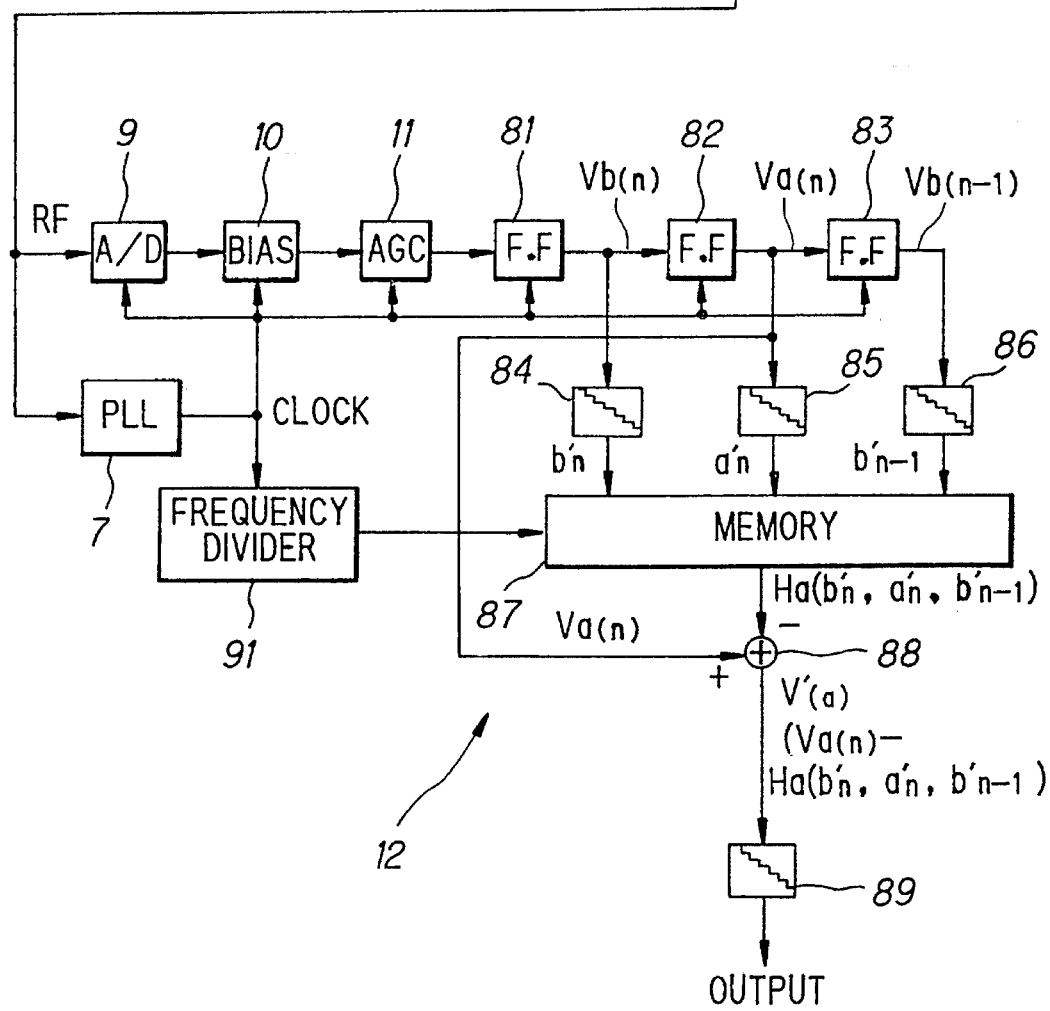
FIG. 17 is a block diagram showing a construction of a non-linear equalizer of FIG. 8.

Accordingly, in this invention, the non-linear equalizer 12 shown in FIG. 8 is designed as shown in FIG. 17.

In the embodiment shown in FIG. 17, the output of the AGC circuit 11 is successively supplied to three-stage flip flops (registers) 81 to 83, and the outputs of the flip flops are supplied to decoding circuits 84 to 86, respectively. These decoding circuits 84 to 86 are designed as shown in FIG. 15. The outputs of the decoding circuits 84 to 86 are input to a memory (RAM) 87.

The memory 87 outputs to an adding circuit 88 data which corresponds to an address indicated by the outputs of the decoding circuits 84 to 86. The adding circuit 88 subtracts the data read out from the memory 87 from the output of the flip flop 82 (adds the polarity-inverted data read out from the memory 87 with the output of the flip flop 82), and outputs the result to the decoding circuit 89. The decoding circuit 89 is the same construction as the decoding circuits 84 to 86. The data which are decoded by the decoding circuit 89 are supplied to the error detecting and correcting circuit 13, and then output to a circuit (not shown). The A/D converter 9, the bias removing circuit 10, the AGC circuit 11 and the flip flops 81 to 83 are supplied with the clocks generated in the PLL circuit 7.

Next, the operation of the non-linear equalizer thus constructed will be described below.

In the following description, it is assumed that the intersymbol interference is caused by two edges which are located before and after a target edge to be decoded, respectively. Representing the intersymbol interference to data an at the front-end edge by Ha(bn,an,bn−1), the reproduced signal level Va(n) is represented by the following equation:

$$Va(n)=(\Delta r \cdot an)+Ha(bn,an,bn-1)+C \quad (3)$$

Further, representing the intersymbol interference to data bn at the rear-end edge by Hb(an+1, bn,an), the reproduced signal level Vb(n) is represented by the following equation:

$$Vb(n)=(\Delta r \cdot bn)+Hb(an+1,bn,an)+C \quad (4)$$

Since the flip flops 81 to 83 successively output the input data to a subsequent stage every time a clock is input thereto, at the timing when the flip flop 82 outputs Va(n), the flip flop 83 outputs the reproduced signal level Vb(n−1) for an edge prior to the edge for Va(n), and the flip flop 81 outputs the reproduced signal level Vb(n) for an edge subsequent to the edge for Va(n).

The decoding circuits 84 to 86 decode the outputs of the flip flops 81 to 83 respectively according to the characteristic as shown in FIG. 13 to output decoded data b'n, a'n,b'n−1. These decoding results would be correct data if there exists no non-linear intersymbol interference Ha(bn,an,bn−1). Actually, any intersymbol interference exists, so that any error occurs. However, assuming the value of the intersymbol interference Ha(bn,an,bn−1) not to be so large, the values b'n, a'n and b'n−1 obtained by the decoding circuits 84 to 86 could be estimated to be different from the correct decoded values bn,an,bn−1 by ± one level at maximum. That is, the following equations are satisfied:

$$b'n=bn \pm 1 \quad (5)$$

$$a'n=an \pm 1 \quad (6)$$

$$b'n-1=bn-1 \pm 1 \quad (7)$$

The variation of the shift position of pits is very minute. Therefore, even when an error of ±1 occurs in a decoding result, the amount of an estimation error in edge position of a pit which is caused by the above error is also very minute. Accordingly, the error Ea(n), represented by the following equation, between an actually-occurring intersymbol interference Ha(bn,an,bn−1) and an intersymbol interference Ha(b'n,a'n,b'n−1) which is estimated on the basis of data obtained through the decoding result has a very small value.

$$Ea(n)=Ha(bn,an,bn-1)-Ha(b'n,a'nb'n-1) \quad (8)$$

Accordingly, the non-linear intersymbol interference Ha(bn,an,bn−1) is beforehand calculated (a calculation method will be described later), and it is stored as a correction value in the memory (RAM) 87. Further, the memory 87 is referred to with data (estimation values) b'n,a'n,b'n−1 which are obtained through a simple decoding operation by the decoding circuits 84 to 86. If a value obtained in this operation is used as a correction value (intersymbol interference), there is little difference between the value (estimated intersymbol interference) and the actual intersymbol interference based on the actual data bn,an,bn−1.

Accordingly, the intersymbol interference Ha(b'n,a'n,b'n−1) which is read out from the memory 87 on the basis of the estimation values b'n,a'n,b'n−1 output from the decoding circuits 84 to 86 is added with the reproduced value Va(n) in the adding circuit 88 to obtain a value V'(a) represented by the following equation:

$$V'(a)=Va(n)-Ha(b'n,a'n,b'n-1) \quad (9)$$

The value V'(a) corresponds to a reproduced value when substantially no intersymbol interference exists.

As described above, the reproduced value Va(n) input to the adding circuit 88 from the flip flop 82 suffers any intersymbol interference, and thus it is represented by the following equation:

$$Va(n)=(\Delta r \cdot an)+Ha(bn,an,bn-1)+C \quad (10)$$

By subtracting the value Ha(b'n,a'n,b'n−1) input from the memory 87 from Va(n) as represented by the equation (10), if Ha(bn,an,bn−1) is substantially equal to Ha(b'n,a'n,b'n−1), the output V'(a) of the adding circuit 88 is substantially represented by the following equation:

$$V'a(n)=(\Delta \cdot an)+C \tag{11}$$

The equation (11) is equal to the (1) in the ideal state as described above. Accordingly, if V'a(n) is decoded in the decoding circuit 89, the correct decoding value could be obtained.

In the above case, the level of the reproduced signal Va(n) corresponding to the front-end edge of the pit is sampled, and decoded. However, the same operation is also carried out when the level of the reproduced signal Vb(n) corresponding to the rear-end edge of the pit is sampled, and decoded.

Figure 18:
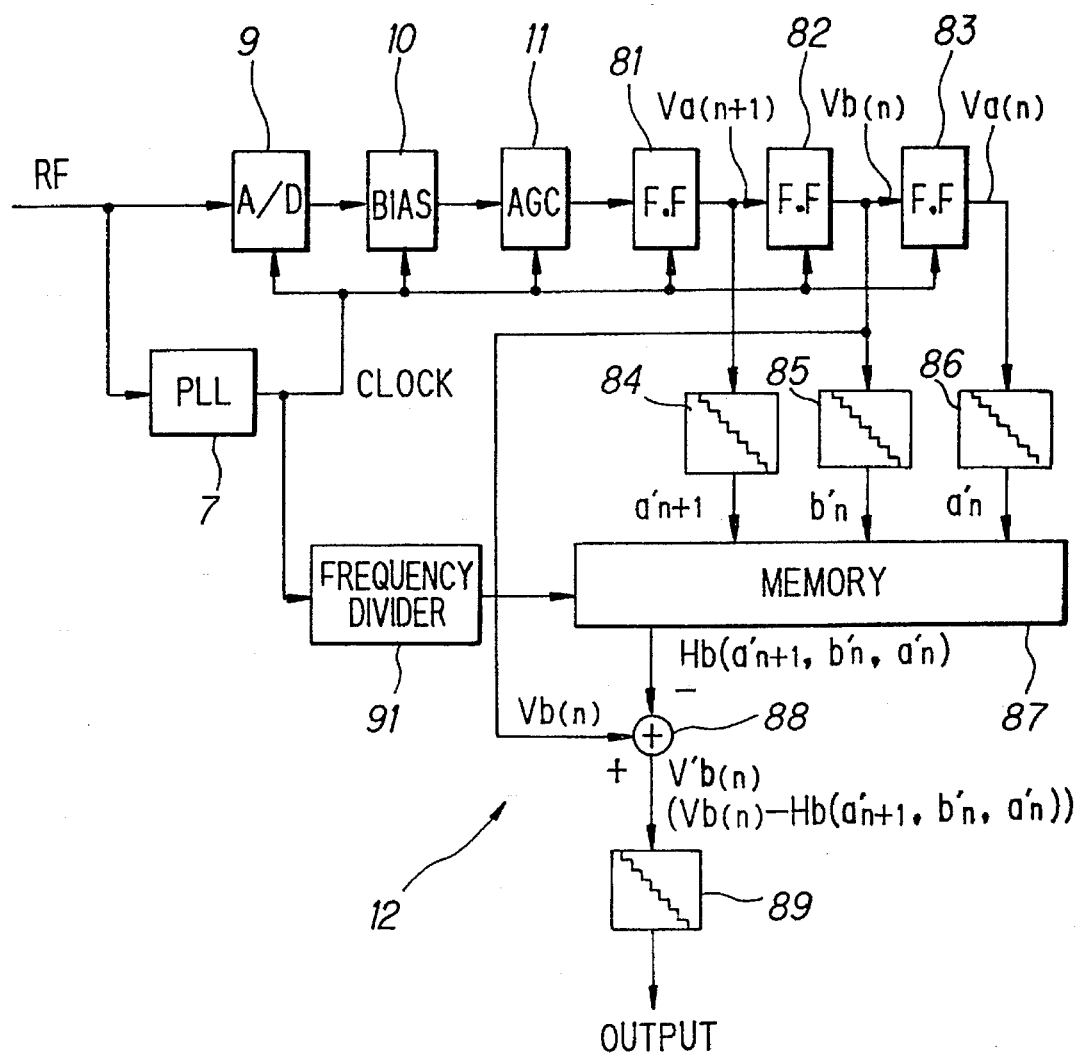
FIG. 18 is a block diagram showing a construction of an non-linear equalizer 12 for decoding a signal corresponding to the edge at the rear end of a pit.

FIG. 18 is a block diagram showing the construction of the non-linear equalizer 12 when a signal corresponding to the rear-end edge of a pit is decoded, and shows a case where the state is varied from the state of FIG. 17 by one clock. The reproduced value Va(n) which is held in the flip flop 82 in the state of FIG. 17 is transferred to the flip flop 83 at the subsequent stage in the state shown in FIG. 18. Further, the reproduced value Vb(b) which is held in the flip flop 81 in the state shown in FIG. 17 is transferred to the flip flop 82 at the subsequent stage in the state shown in FIG. 18. In the flip flop 81, the next reproduced value Va(n+1) is held.

Accordingly, in the same manner as the circuit shown in FIG. 17, the reproduced value Vb(n) held in the flip flop 82 is decoded by the circuit shown in FIG. 18. However, the intersymbol interference at the front-end edge of the pit and the intersymbol interference at the rear-end edge of the pit are different from each other, and thus correction values for both of the intersymbol interferences (a correction value for the front-end edge and a correction value for the rear-end edge) are before stored. A signal obtained by ½-dividing the clock output from the PLL circuit 7 in a divider 91 is input to, for example, the most significant bit of the memory 87 to selectively use the correction value read out from the memory 87 for one of the front-end edge and the rear-end edge in accordance with the signal.

Here, the calculation method of the intersymbol interferences Ha and Hb will be described.

As described above, in this system, the educational pits P6 (FIG. 4) are periodically recorded, and all the front-end and rear-end edge positions M and N of the pits are known. Of the signals obtained by reproducing the educational pits P6, those signals which are obtained at the front-end edges are represented by Va(M,N), and those signals which are obtained at the rear-end edges are represented by Vb(M,N). In this case, the following equations are satisfied:

$$Va(M,N)=\Delta r \cdot M+Ha(N,M,7)+C \tag{12}$$

$$Vb(M,N)=\Delta r \cdot N+Hb(K,N,M)+C \tag{13}$$

Provision of a constant "7" in the equation (12) is based on the fact that data recorded at the edge of the reference pit P5 which is located just prior to the educational pit P6 is "7" (FIG. 4). The variable K in the equation (13) represents data (one of "0" to "7") recorded just after the educational pit P6.

On the basis of the signals from the educational pits P6 thus obtained and the reproduction levels Va(M,N) and Vb(M,N), values to be stored as correction values in the memory can be calculated by the following equations although these values are approximate values:

$$Ha(N,M,i)=Va(M,N)-\Delta r \cdot M-C (i=0, 1, 2, \ldots, 7) \tag{14}$$

$$Hb(j,N,M)=Vb(M,N)-\Delta r \cdot N-C (j=0, 1, 2, \ldots, 7) \tag{15}$$

In the equations (14) and (15), intersymbol interferences (i or j) other than the intersymbol interference between the two edges (M and N) of the same pit (educational pit P6) are neglected (that is, the same correction value is used even when the value of i or j is equal to any value of 0 to 7). However, these values would be sufficiently usable as initial values for the correction values when the edges recorded in the same pit provide the strongest intersymbol interference. Accordingly, these initial values are beforehand stored in the memory 87.

As described above, if the reproduced signal from the front-end edge of a pit can be corrected, the reproduced signal from the rear-end edge of the pit can be corrected by the same circuit. Accordingly, in the following description, only a case where the reproduced signal from the front-end edge of a pit is decoded will be described as a rule.

Figure 19:
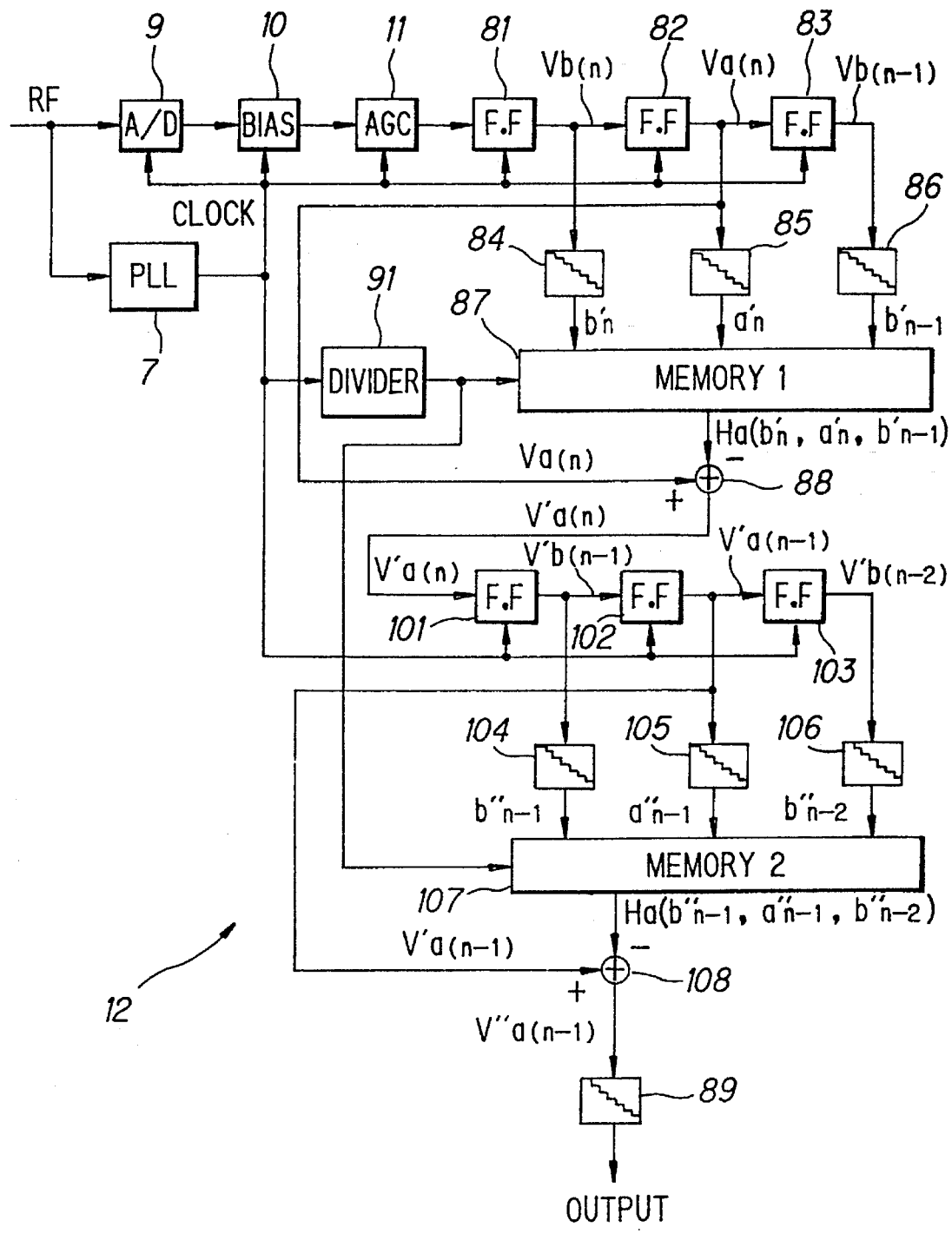
FIG. 19 is a block diagram showing the principle of cascade-connecting the embodiment of FIG. 18.

If the intersymbol interference can be corrected with the circuit shown in FIG. 17, the intersymbol interference may be further removed by arranging a plurality of these circuits in a cascade-connection as shown in FIG. 19, for example. That is, in this embodiment, at a subsequent stage to the circuit comprising the flip flops 81 to 83, the decoding circuits 84 to 86, the memory 87 and the adding circuit 88, are connected to flip flops 101 to 103, decoding circuits 104 to 106, a memory 107 and an adding circuit, which are designed in the same construction as the above elements. The output of the adding circuit 108 is supplied to the decoding circuit 89.

However, as shown in FIG. 19, in a simple cascade-connection of these circuit unit, if an error decoding operation is carried out, for example, in the decoding circuits 84 to 86 at the first stage, a correction value for an incorrect intersymbol interference is read out from the memory 87, so that an erroneous correcting operation based on the erroneous correction value cannot be corrected at the second and subsequent stages. As a result, it is difficult to accurately decode the data.

Further, in the circuit shown in FIG. 19, a correction value for the intersymbol interference corresponding to the reproduced value Va(n) is read out from the memory 87. The correction of the reproduced value V'a(n) which has been already corrected in the first-stage circuit is performed in the memory 107, and thus correction values to be stored in the memory 107 must be set to be different from those stored in the memory 87 at the first stage. Therefore, in consideration of a real-time renewing operation of the correction values in the memories 87 and 107, a calculation time for the renewing operation is long, and thus it is finally difficult to perform the real-time renewing operation.

Figure 20:
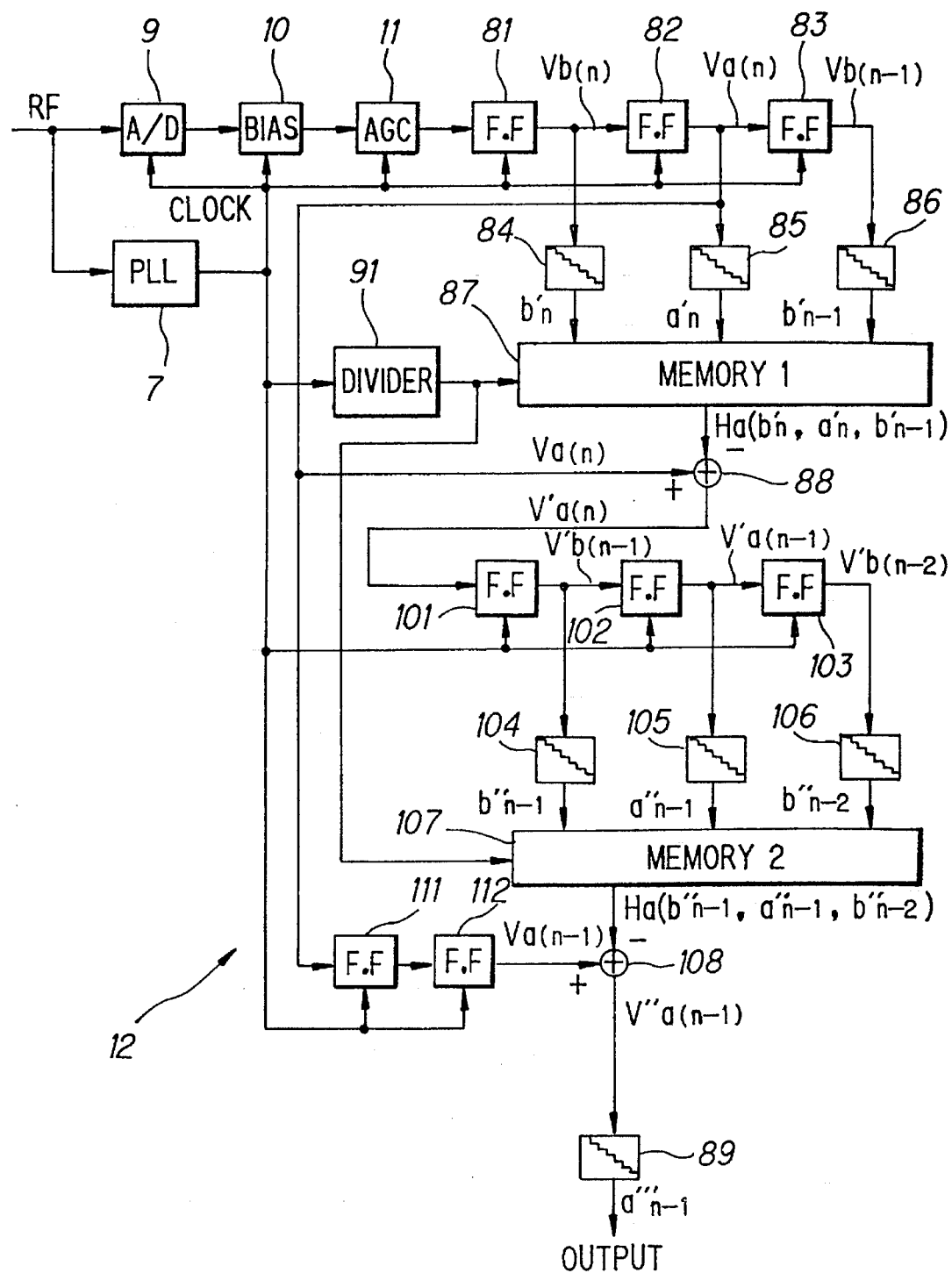
FIG. 20 is a block diagram showing a construction of the embodiment of FIG. 18 which is cascade-connected.

In view of the foregoing, a connection shown in FIG. 20 can be used for the cascade connection. Like the circuit shown in FIG. 19, in this circuit arrangement, at the subsequent stage to the first-stage circuit comprising the flip flops 81 to 83, the decoding circuits 84 to 86, the memory 87 and the adding circuit 88 is provided the second-stage circuit comprising the flip flops 101 to 103, the decoding circuits 104 to 106, the memory 107 and the adding circuit 108 which are designed in the same construction as the first-stage circuit. However, the reproduced value to be supplied to the adding circuit 108 is not the output of the flip flop 102 at the second stage, but the output of the flip flop 82 at the first stage. That is, the output of the flip flop 82 is delayed by two clocks in the flip flops 111 and 112, and then supplied to the adding circuit the correction value to be read out from the memory 107 and the read-out timing are adjusted. The other construction is identical to that of the circuit shown in FIG. 19.

With this construction, a reproduced value which has not yet been corrected is corrected in the second stage like the first stage, and the correction value to be stored in the memory 107 at the second stage may be identical to the correction value to be stored in the memory 87 at the first stage.

Figure 21:
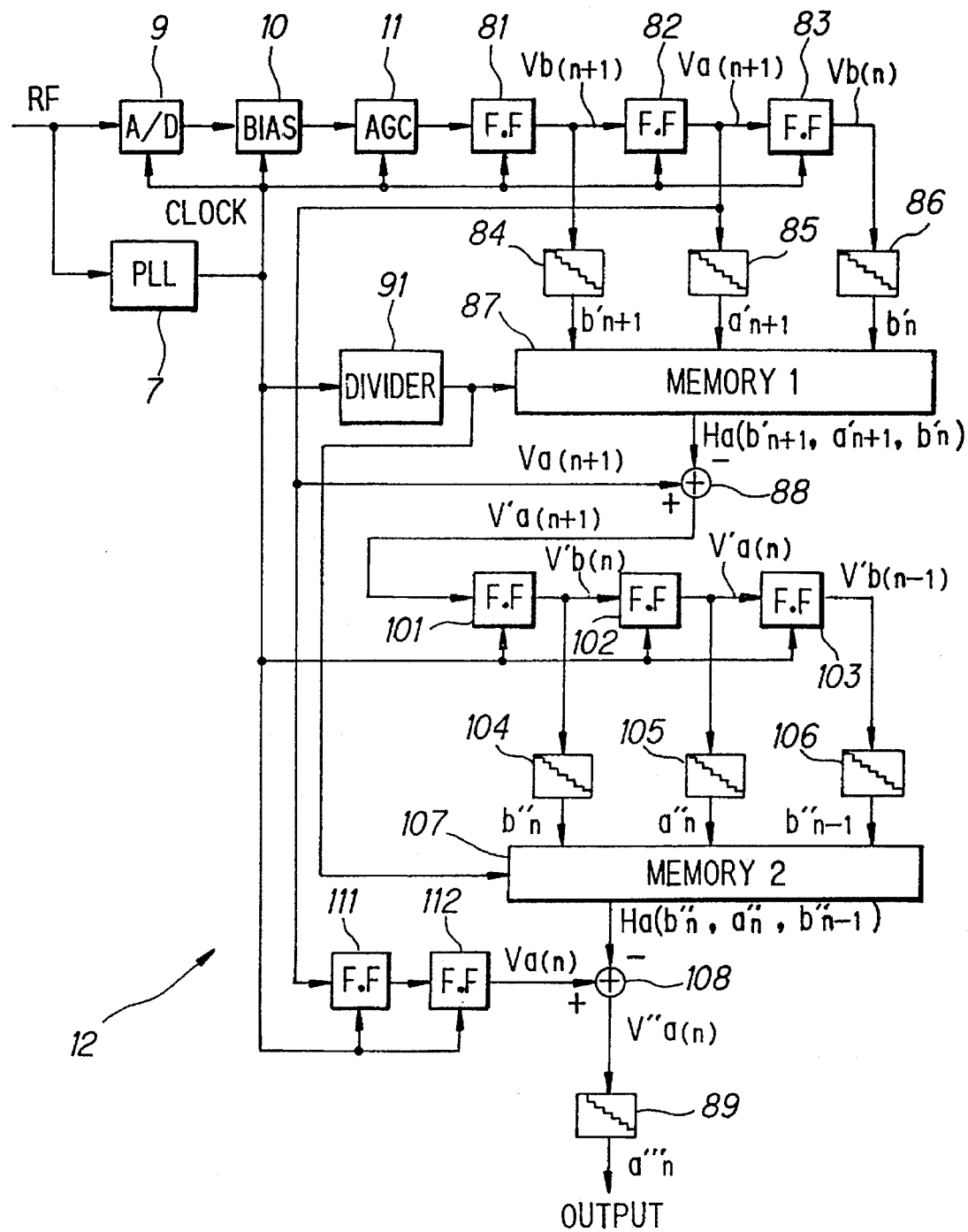
FIG. 21 is a block diagram showing a state after a time corresponding to two clocks elapses from the state of FIG. 20.

That is, the reproduced value Va(n) which is held in the flip flop 82 at the first stage of FIG. 20 is corrected in the adding circuit 88 in correspondence with the correction value stored in the memory 87 at the first stage, and it is varied to a state shown in FIG. 21 with a time lapse corresponding to two clocks from the state shown in FIG. 20.

That is, the reproduced value V'a(n) corrected in the first stage is held in the flip flop 102 of the second stage. At this time, the reproduced value Va(n) which was held in the flip flop 82 before a time corresponding to two clocks is supplied from the flip flojp 112 to the adding circuit 108.

It is expected that as compared with the decoding values (estimation values) b'n,a'n,b'n−1 supplied to the memory 87 the first stage shown in FIG. 20, the decoding values b"n,a"n,b"n−1 of the second stage shown in FIG. 21 which are corrected to remove the intersymbol interference and then decoded in the circuit of the first stage are nearer to the recording data bn,an,bn−1. Accordingly, the intersymbol interference Ha(b"n,a"n,b"n−1) read out from the memory 107 is nearer to the true intersymbol interference Ha(bn, an, bn−1) than the intersymbol interference Ha(b'n,a'n,b'n−1) read out from the memory 87 in FIG. 20. Accordingly, the output V"a(n) of the adding circuit 108 is still nearer to the ideal reproduced value Va(n). Further, the decoding value a'''n which is obtained by decoding the output V"a(n) in the decoding circuit 89 is also still nearer to the recording data an.

Figure 22:
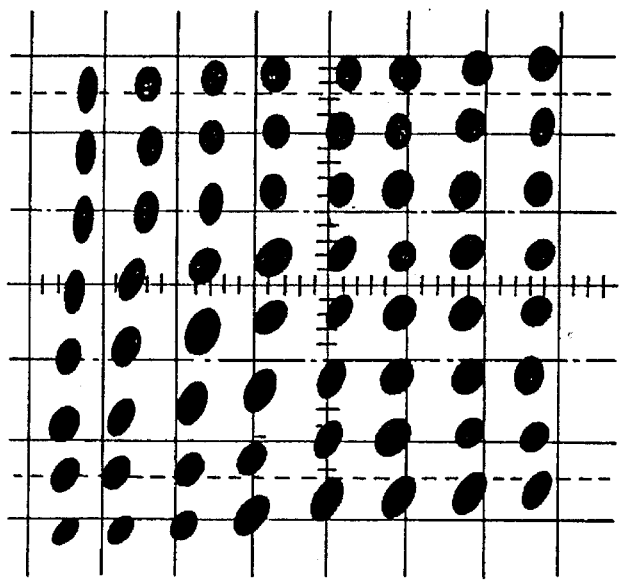
FIG. 22 is an oscillogram for a reproduced signal at the input stage of the non-linear equalizer which is observed through an oscilloscope.

FIG. 22 shows an oscilloscope image (oscillogram) of the reproduced values Va(n) and Vb(n) held in the flip flops 82 and 81 of the first stage in FIG. 20(FIG. 21) respectively, which are input to X-axis and Y-axis of an oscilloscope and observed. The edge positions of the front and rear ends of each pit are stepwise shifted to any one of the 8-level positions of "0" to "7", and thus it is ideally expected that brightness points of 64 (=8×8) appear at an equi-interval.

However, the whole outline of the 64 brightness points is not a square, but it is deformed to a rhombus shape due to non-linear intersymbol interference. In addition, each brightness point is not a point, but blurred (has a breadth). This means that a large amount error would occur if the reproduced value is directly decoded.

Figure 23:
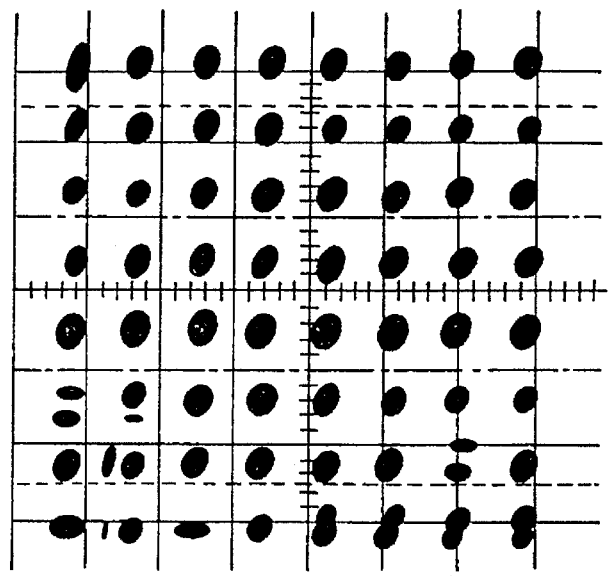
FIG. 23 is an oscillogram corresponding to the output of the embodiment of FIG. 17 which is observed through an oscilloscope.

On the other hand, FIG. 23 shows an oscillogram of the reproduced values which are corrected in the correction circuit of the first stage as shown in FIG. 17 (FIG. 18), and input to the oscilloscope for observation (that is, the reproduced values held in the flip flops 102 and 101 are represented). Some of the reproduced values at the lower left side of the oscillogram are deviated from ideal values, so that these values are erroneously identified as data of neighboring shift positions. Therefore, the correction value is slightly deviated from the correct value, and thus the reproduced signal is observed to be deviated from the ideal value.

Figure 24:
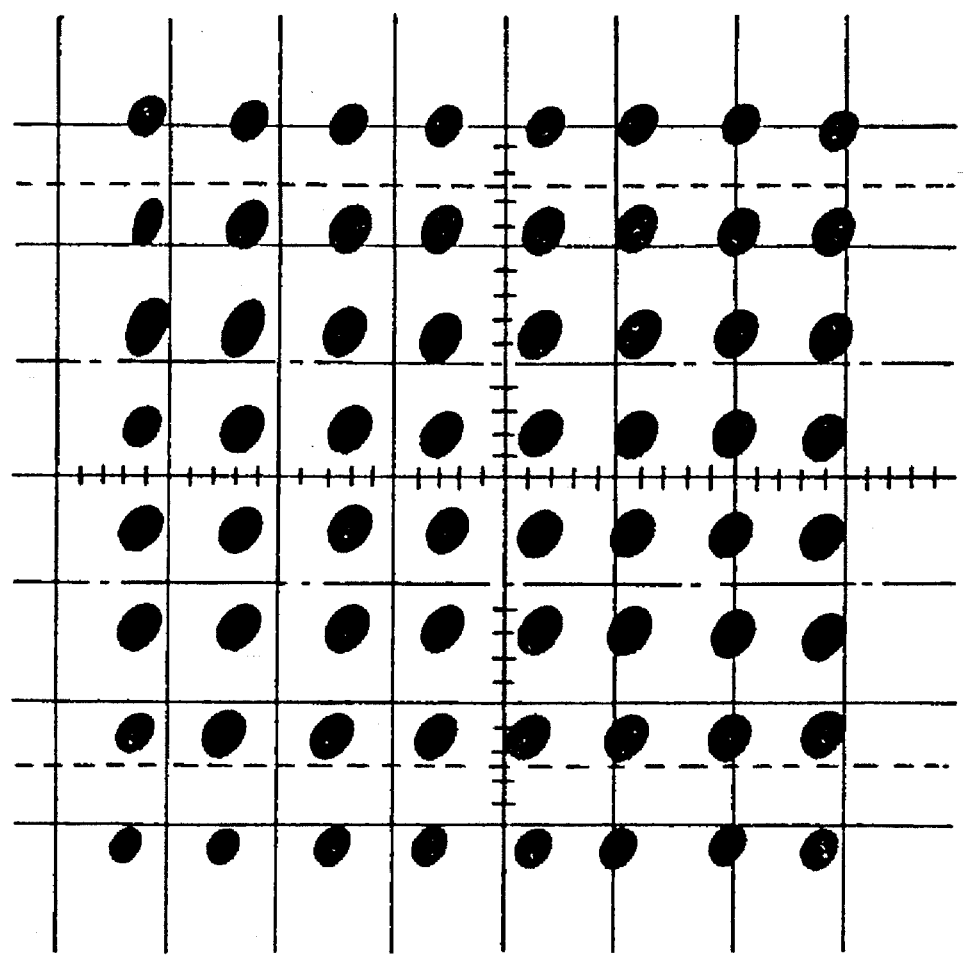
FIG. 24 is an oscillogram corresponding to the output of the embodiment of FIG. 20 which is observed through an oscilloscope.

On the other hand, FIG. 24 shows an oscillogram of the reproduced values which are corrected in the correction circuit of the second stage and input to the oscilloscope for observation. From FIG. 24, it is apparent that the distortion of the oscillogram is reduced. Accordingly, if these reproduced values are decoded, more correct decoding data can obtained with suppressing the effect of the intersymbol interference.

Figure 25:
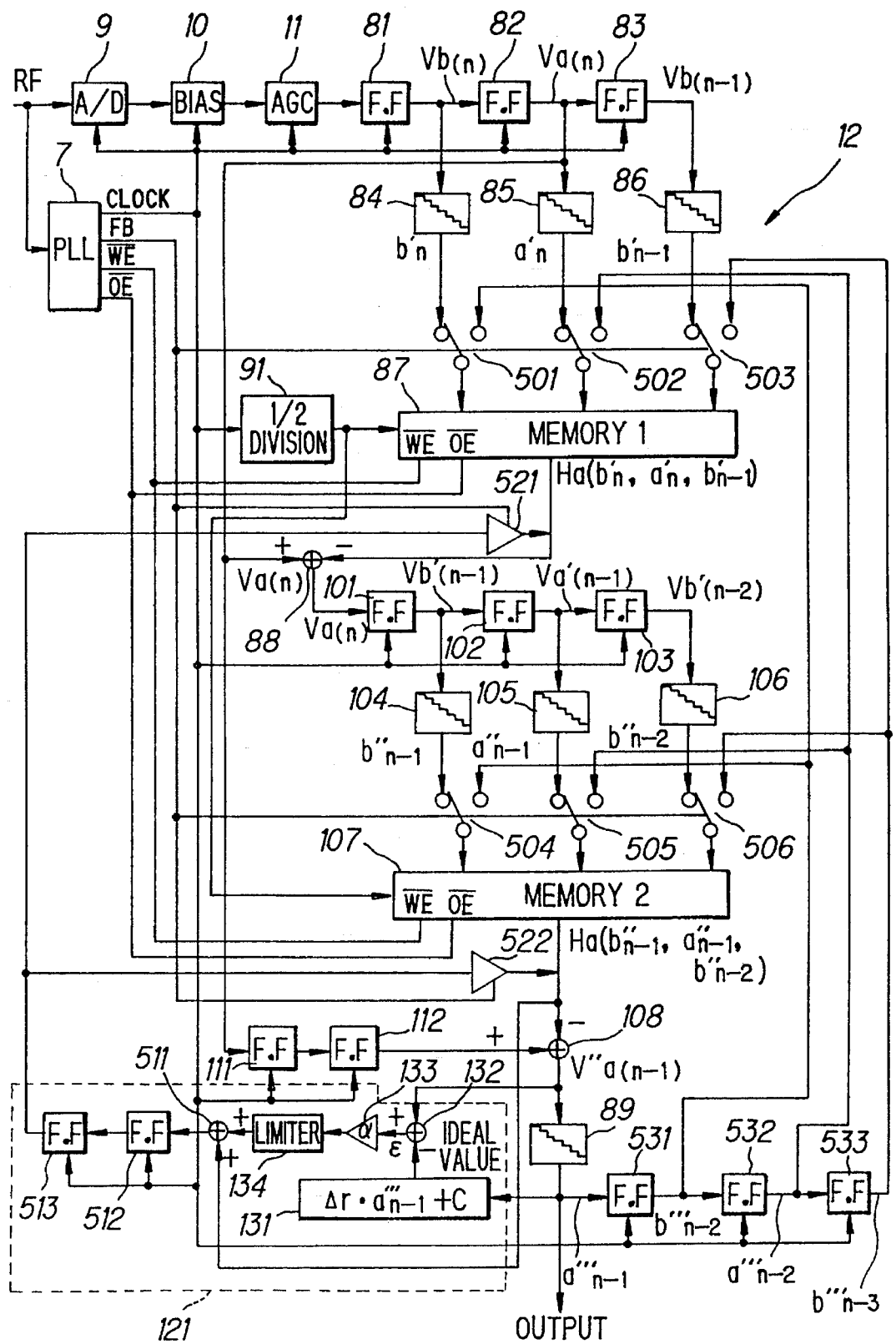
FIG. 25 is a block diagram showing another construction of the non-linear equalizer 12.

FIG. 25 shows a circuit in which the correction value stored in the memories 87 and 107 can be renewed at high speed and on a real time basis. In this embodiment, the ideal value is calculated from a decoding value a'''n−1 output from the decoding circuit 89 according to the following equation in a calculation circuit of a learning function circuit 121.

$$\text{ideal value} = \Delta r \cdot a''' n{-}1 + C \tag{16}$$

The ideal value can be simply calculated because $\Delta r$ and C are known values.

On the other hand, an adding circuit 132 adds the polarity-inverted ideal value (subtracts the ideal value) output of the calculation circuit 131 to (from) the output V"a(n−1) of the adding circuit 108 to obtain an error $\epsilon$. The error $\epsilon$ corresponds to the difference between the correct correction value and the correction value which is actually stored in the memory 87, 107. Accordingly, the error $\epsilon$ is multiplied by a constant $\alpha$ in a multiplying circuit, and a multiplication result is limited within a predetermined range by a limiter 134.

The multiplication of the error $\epsilon$ by the constant $\alpha$ is performed to prevent oscillation of the correction value stored in the memories 87 and 107. Therefore, the constant $\alpha$ is preferably set to a value smaller than "1". Further, when any defect exists on the optical disc 1, the correction value may be unintentionally renewed to an abnormal value due to the defect. The limitation of the value to be renewed in the limiter 134 prevent this erroneous renewing.

It can be guessed that the error $\epsilon$ occurs due to deviation of the correction value stored in the memories 87 and 107 from the correct value. Accordingly, the error $\epsilon$ output from the limiter 134 is added to the correction value read out from the memory 107 in an adding circuit 511 to adjust the correction value to a more correct value.

The new correction value thus corrected is supplied to the memories 87 and 107 through flip flops 512 and 513 and three-state buffers 521 and 522 to renew the values stored in these memories.

Addresses off the memories 87 and 107 are required to perform the above renewing operation. In order to obtain these addresses, data (pit edge positions) recorded at front and rear sides of the data an serving as a decode target are required. In order to satisfy this requirement, the output of the decoding circuit 89 is successively supplied to the flip flops 531, 532 and 533, and held therein. The data which are held in these flip flops 531 to 533 are successively supplied to the memory 87 or 107 through switches 501 to 503 or switches 504 to 506.

As described above, the address which is required to read out the correction value from the memory 87 or 107 and then renew the correction value is delayed by two clocks from the read-out time of the correction value. Therefore, the correction value itself to be supplied to the memory 87 or 107 is delayed by clocks by the flip flops 512 and 513, and then supplied to the memory 87 or 107 through the three-state buffer 521 or 522.

The address with which the correction value is read out from the memory 87, 107 is not necessarily coincident with an address with which the new correction value is stored. That is, the data which are decoded in the decoding circuits 84 to 86 are not necessarily coincident with the data which are finally decoded in the decoding circuit 89 and then held in the flip flops 531 to 533. Likewise, the data decoded by the decoding circuits 104 to 106 are not necessarily coincident with the data held in the flip flops 531 to 533.

Accordingly, the switches 501 to 503 are provided to the memory 87 and the switches 504 to 506 are provided to the memory 107 to switch the address for reading out the correction value from the memory 87, 107 and the address for renewing the correction value to a new correction value to each other.

Figure 26:
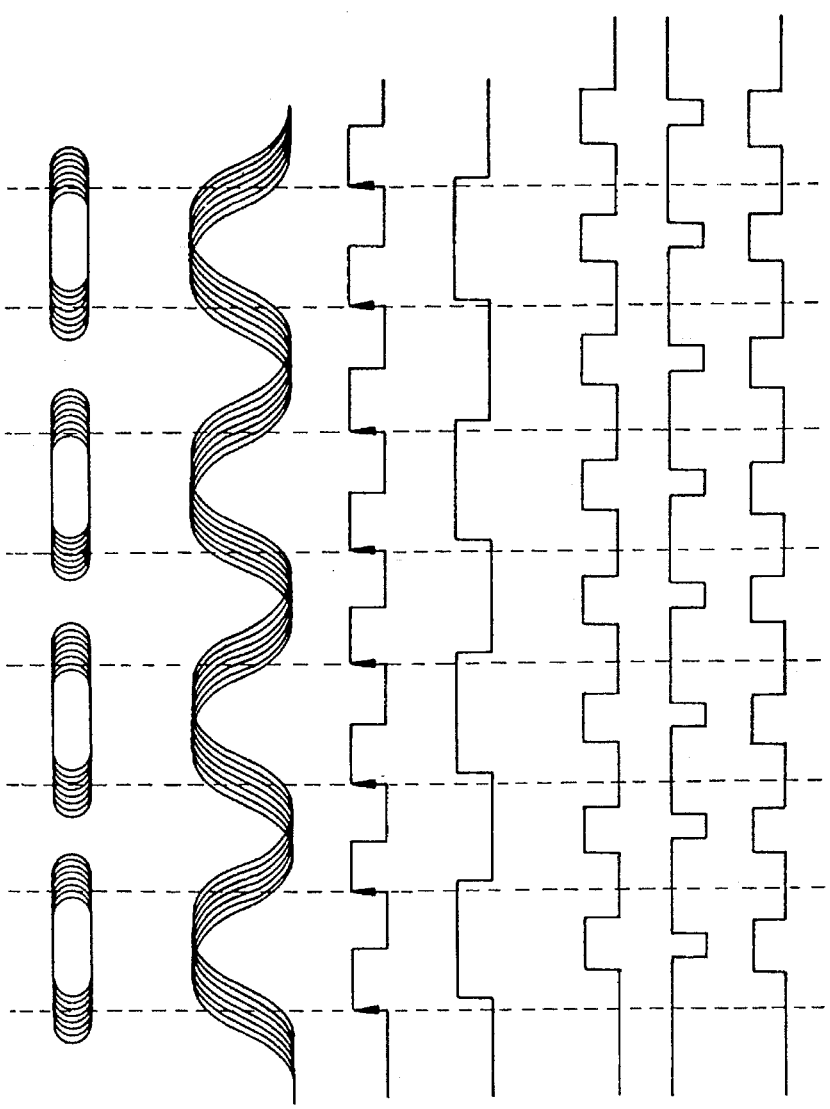
FIG. 26 is a timing chart showing the operation of the embodiment of FIG. 25.

FIG. 23 shows a timing chart for the read-out and write-in of the correction value in the memory 87 (memory 107). The RF signal of FIG. 26 is supplied to the A/D converter 9 and the PLL circuit 7 in accordance with a pit array shown in FIG. 26. The PLL circuit 7 generates a clock shown at a three stage of FIG. 23 from the top on the basis of the input RF signal, and outputs it to the A/D converter 9. As apparent from the RF signal and the clock of FIG. 26, the leading edge of the clock occurs at the timing of the front and rear edges of each pit. Accordingly, the A/D converter 9 samples the level of the reproduced signal in correspondence with the front and rear edges of each pit. The sampled value is supplied to a subsequent-stage circuit.

As shown at a fourth stage of FIG. 26, the clock is subjected to the ½-frequency division by the divider 91 to generate a signal whose period is two times as long as the clock. This signal output from the ½ divider 91 is supplied to the memories 87 and 107 to switch the correction value for the front-end edge of each pit and the correction value for the rear-end edge of each pit are switched to each other.

On the other hand, the read-out of the correction value from the memories 87 and 107 is performed at the timing of the leading edge of the clock shown in FIG. 26. Therefore, the PLL circuit 7 sets an FB signal shown at a fifth stage of FIG. 26 to be low, and switches the switches 501 to 503 and the switches 504 to 506 to the left side of FIG. 25. Further, it sets an OE (written with a line affixed above the letter "OE") signal to be low. As a result, the correction value is read out and output from the memory 87 using as an address the signal which is input from the decoding circuits 84 to 86 through the switches 501 to 503 to the memory 87.

Likewise, the signal output from the decoding circuits 104 to 106 is supplied as an address to the memory 107 through the switches 504 to 506, and the correction value corresponding to the address is read out and output from the memory 107.

At this time, the three-state buffers 521 and 522 are kept in an open state because the FB signal serving as a control signal supplied to these buffers is set in a low level. Therefore, the data held in the flip flop 513 are prevented from being output onto data lines of the memories 87 and 107 and mixed with read-out data of the memories 87 and 107.

On the other hand, the PLL circuit 7 generates a WE (with a line affixed above the letter "WE") signal shown at a sixth stage of FIG. 26, and supplies it to the memories 87 and 107. The memories 87 and 107 executes a write-in operation when the WE signal is set to a low level. When the WE signal of FIG. 26 is instantaneously set to the low level, the FB signal shown in FIG. 6 is in a high level. Accordingly, the switches 501 to 503 and the switches 504 to 506 are switched to the right side of FIG. 25. As a result, the data which are held in the flip flops 531 to 533 are supplied as an address to the memory 87 or 107 through the switches 501 to 503 or the switches 504 to 506.

At this time, the three-state buffers 521 and 522 are opened because the FB signal supplied thereto is in the high level, and a new correction value held in the flip flop 513 is supplied onto the data lines of the memories 87 and 107. As a result, in the memories 87 and 107, the correction value corresponding to the address held in the flip flops 531 to 533 is renewed to the new correction value held in the flip flop 513 according to the following equation. In the following equation, δ represents the output of the limiter 134.

$$Ha(b'''n-2, a'''n-2, b'''n-3) = Ha(b'''n-2, a'''n-2, b'''n-3) + \delta$$

Even when the initial values of the memories 87 and 107 are set to zero, proper correction values are automatically generated and stored through the repetitive renewing operation.

Figure 27:
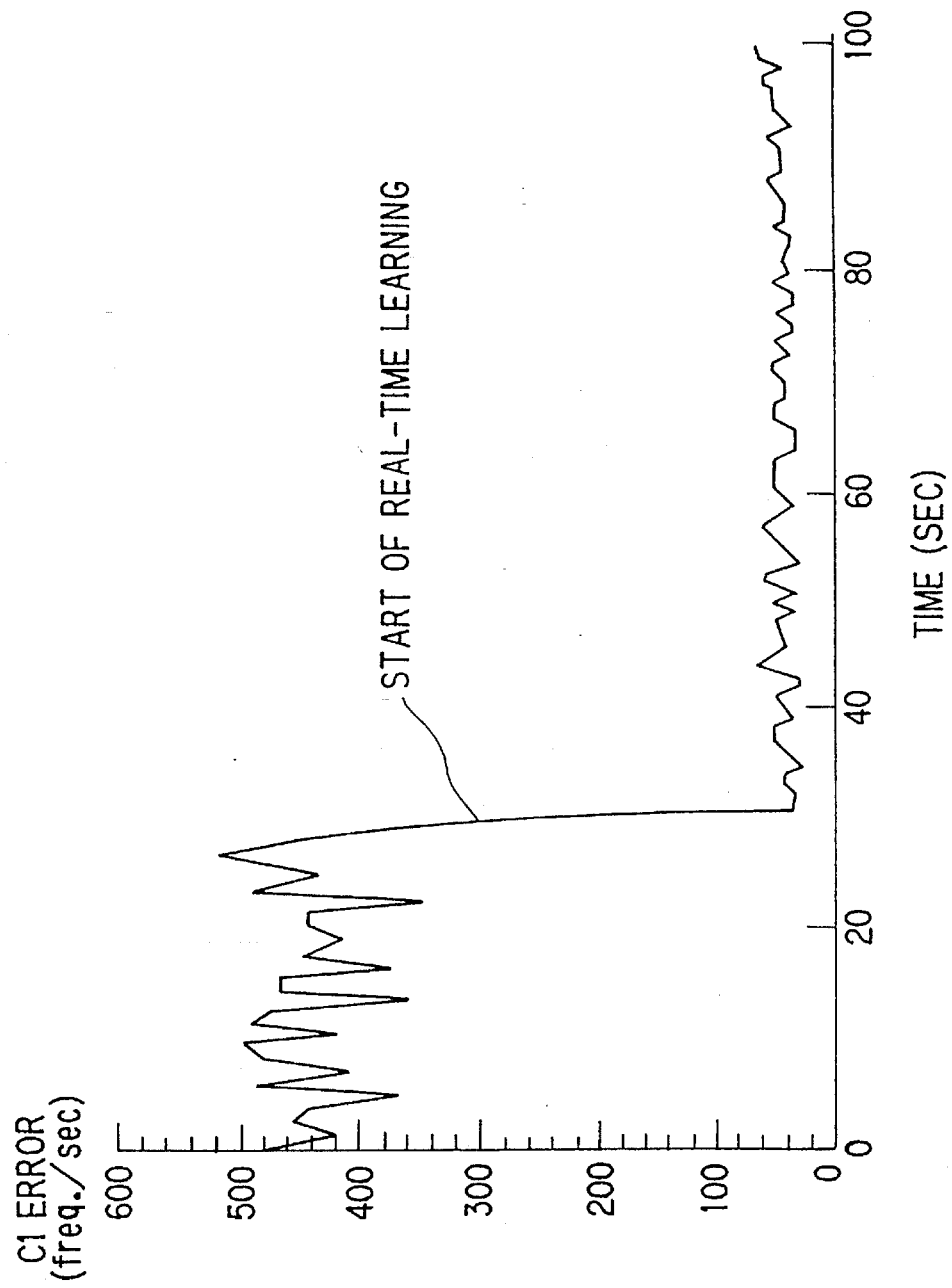
FIG. 27 is a graph showing a characteristic of the embodiment of FIG. 25.

FIG. 27 is a graph showing an error rate (CI error) of decoding data when the storage values of the memories 87 and 107 are corrected on a real-time basis in the manner as described above. As shown in FIG. 27, when the correction values of the memories 87 and 107 are not renewed on a real-time basis, the number off CI error per second is 400 to 500. On the other hand, when the correction values of the memories 87 and 107 are renewed on a real-time basis, the number of CI error per second is reduced to 30 to 50.

The learning function circuit 121 is simply constructed by a logic circuit. Its feedback operation needs no specific and complicated logic circuit, and it can be performed at high speed every clock. Therefore, even when any skew exists on the optical disc 1 and the intersymbol interference is varied at high speed, the correction values can be renewed at high speed in accordance with the above variation of the intersymbol interference.

By repeating the renewing operation of the storage values of the memory as described above, the correct values can be held in the memory at all times. However, there may be imaginable the following case where the storage value of the memory becomes an erroneous value with suffering any defect, or only an appearance possibility of a pattern for a specific edge position is low and thus the correction value for the pattern cannot be sufficiently renewed.

The above state represents that the correct value for the correction value is represented by Ha(bn,an,bn−1), and the correction value is deviated to H'a(bn,an,bn−1) only when recorded information has a value of (i,j,k). That is, this state is represented by the following equation:

$$H'a(bn,an,bn-1) = Ha(bn,an,bn-1) + e(\text{for } bn=i, an=j, bn-1=k) = Ha(bn,an,bn-1) \text{ (for other cases)} \quad (17)$$

In the above equation, e represents a deviation amount of the correction value from the true value. It is now assumed that when an input pattern which would be originally decoded to bn=i, an=j, bn−1 occurs, it, is erroneously decoded to bn=i,an=j+1,bn−1=k because one neighboring edge position is erroneously used due to the deviation e.

Figure 28:
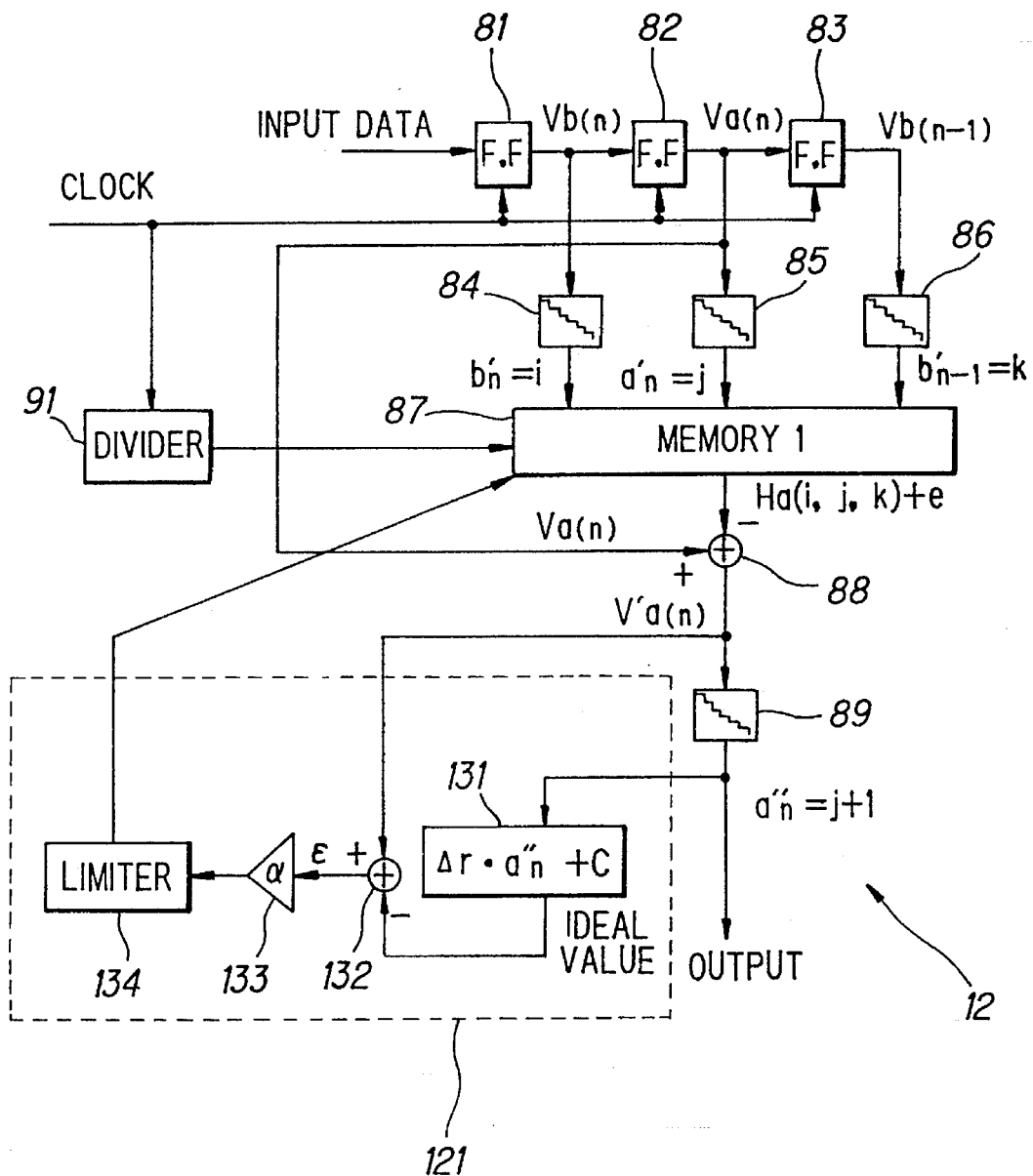
FIG. 28 is a block diagram showing an operation of renewing a storage value in a memory at a one-stage structure.

The renewing operation of the correction value in the above case when the non-linear equalizer 12 is designed in a one-stage structure will be considered with reference to FIG. 28. In order to simplify the figures in embodiments subsequent to the embodiments shown in FIG. 28, the switches 501 to 506, the adding circuit 511, the flip flops 512, 513,531 to 533, and the three-stage buffers 521 and 522 are omitted from the figures, and the output of the limiter 134 is illustrated as being directly supplied to the memories 87 and 107.

The recorded data are assumed to be bn=i, an=j,bn−1=k. The decoding operation of the decoding circuits 84 to 86 is correctly performed. However, since the storage value (correction value) of the memory 87 is incorrect, the correction value has an error e, and the output of the memory is as follows: Ha (i,j,k)+e As a result, the data obtained by decoding in the decoding circuit 89 the reproduced value V'a(n) which is obtained correcting the reproduced value Va(n) on the basis of the above correction value is as follows: a"n=j+1.

When such a decoding result is obtained, the calculation circuit 131 calculates a renew value on the basis off the erroneous decoding result, so that the correction value of bn=j,an=j+1,bn−1=k of the correction values stored in the memory 87 is renewed. However, the correction value corresponding to the error-contained correction value of bn=i, an=j,bn−1=k is not renewed. That is, once an error value is input to the correction value, the erroneous correction value is not corrected even when correct data are subsequently continuously input.

Figure 29:
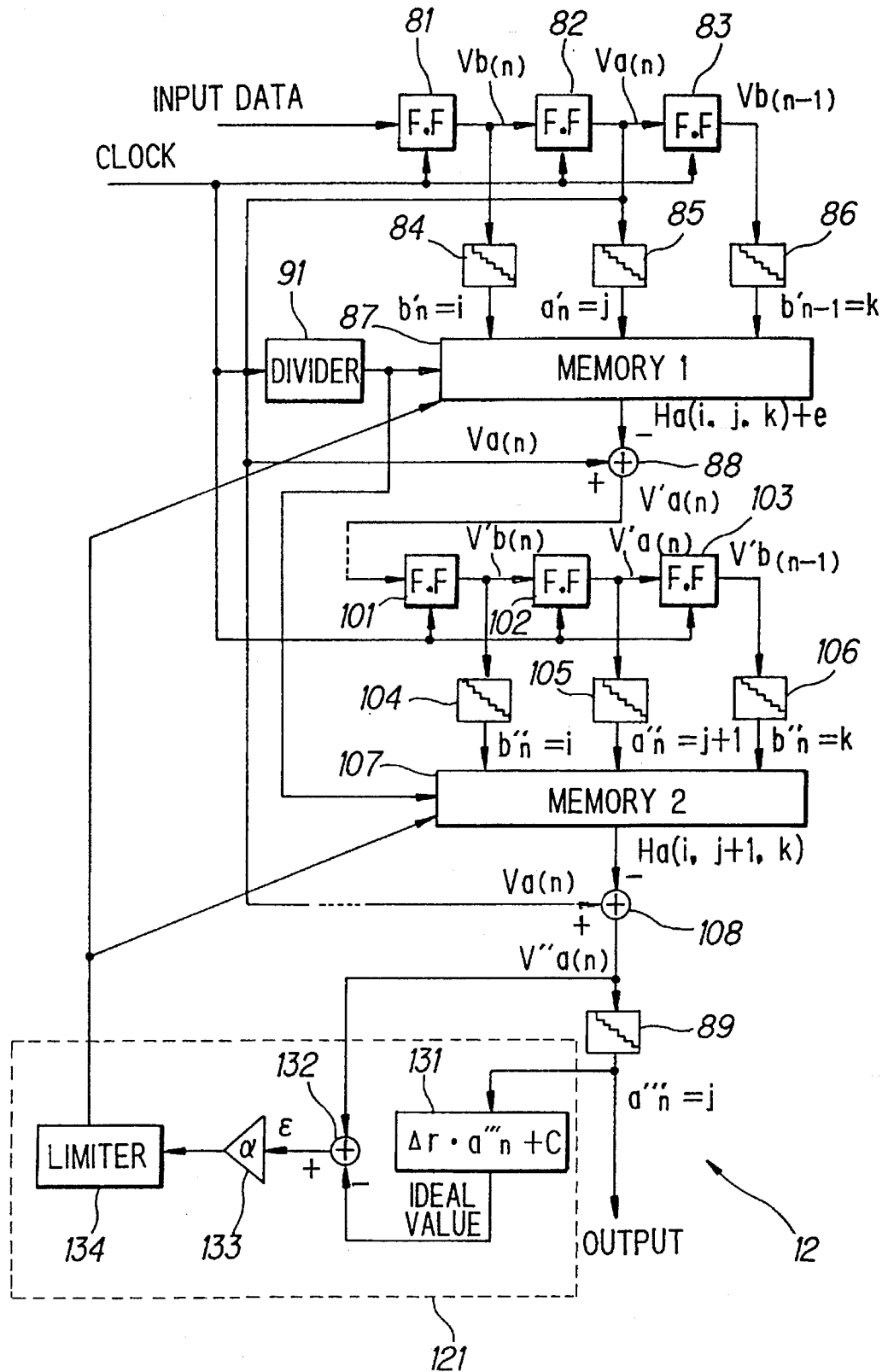
FIG. 29 is a block diagram showing an operation of renewing a storage value in a memory at a two-stage structure.

Next, the renewing operation of the correction value in the above case when the non-linear equalizers 12 are designed in a two-stage (even-stage) structure will be considered with reference to FIG. 29. In FIG. 29, a time lag corresponding to two clocks would be originally exist between the first and second stages. However, in order to simplify the description, data are assumed to be input to each stage on the condition that this time lag is neglected.

Like the case of FIG. 28, it is assumed that the memory 87 at the first stage outputs an error-containing correction value Ha(i,j,k)+e. The decoding circuits 104 to 106 provide a decoding result of b"n=i,a"=j+1,b"n−1=k. As a result, a correction value of Ha(i,j+1,k), not Ha(i,j,k), is obtained as the output of the memory 107. This correction value has no error e. As described above, Ha(i,j+1,k) is substantially equal to Ha(i,j,k), and thus the correction value Ha(i,j,k)+e stored in the memory 87, although not a perfect value, is corrected to the substantially correct correction value Ha(i,j+1,k)≈Ha(i,j,k). Accordingly, the correction value of the memory 87 is repetitively renewed so that the error e is reduced.

In the above embodiments, the number of stages for correction is set to one or two. The same description may be made in the case of using three or more stages for the cascade connection. The number of the stages is preferably set to an even number. In this case, even if any error occurs in a correction value stored in the memory, the error is gradually corrected. In a case of using odd-numbered stages, the error cannot be corrected.

Figure 30:
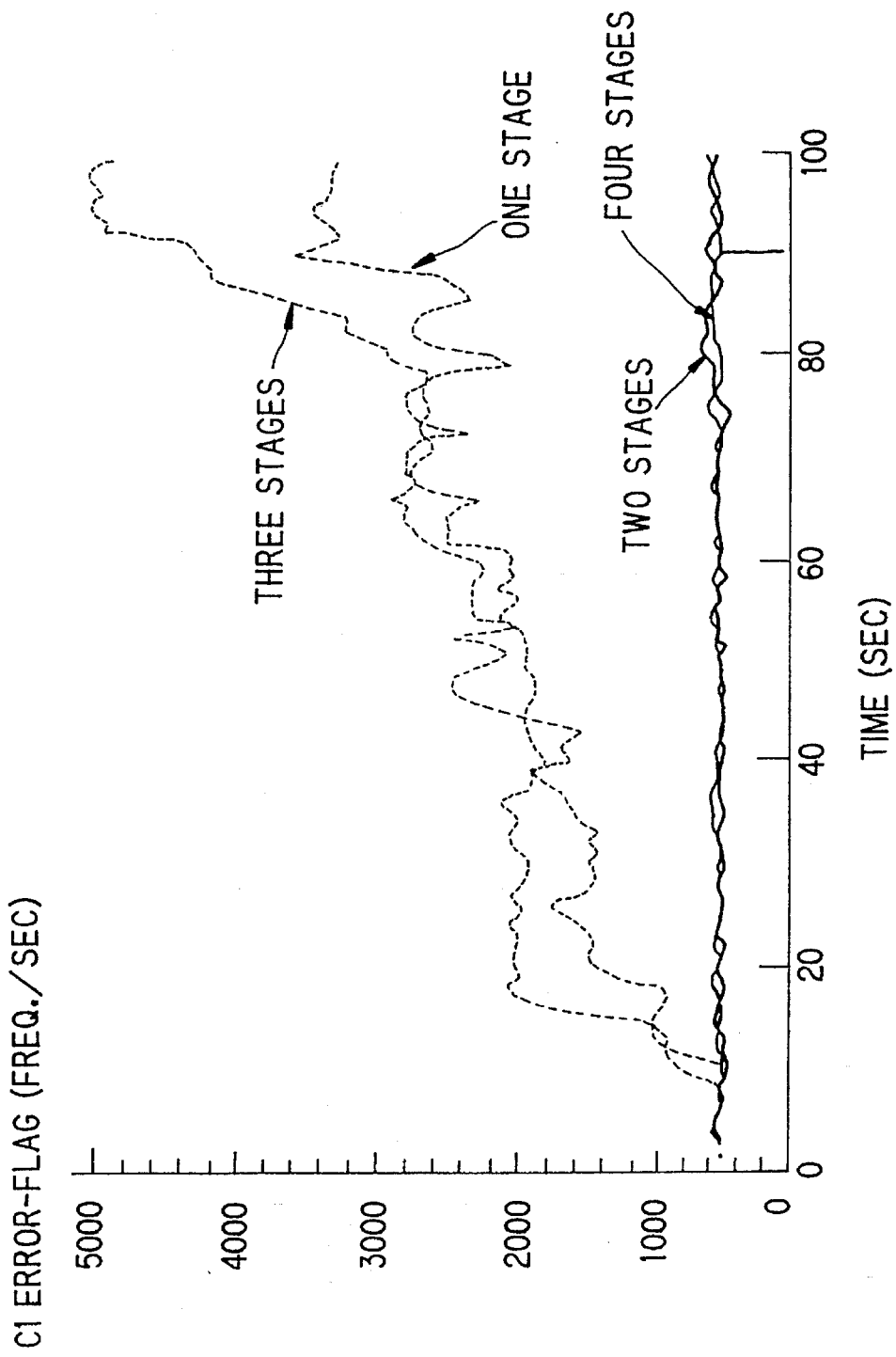
FIG. 30 is a graph showing a decoding result when a stage number for correction is varied.

FIG. 30 is a graph showing the result of an experiment which was performed to confirm the above effect.

In this experiment, external disturbance was intentionally applied to the optical disc 1 to keep the disc in a state having large errors. At this time, the error rate of an output signal varying with time lapse was examined for the non-linear equalizer 12 when the number of stages for cascade connection is varied to one stage, two stages, three stages and four stages.

When a correction value of the memory is renewed in a state of high error rate, the correction value is frequently deviated from the correct value. However, as is apparent from the experiment, in the case of using the cascade-connection of even-numbered stages, the error rate is not so increased, and stabilized to a constant value. That is, even if an incorrect value is stored as a correction value, the subsequent data are correctly decoded, and thus the correction system can be restored to its original correct state. On the other hand, for the cascade-connection of odd-numbered stages, once an incorrect: value is stored as a correction value, the error is not removed, and thus the error rate is increased with time lapse.

In the embodiment as described above, the correction is performed on the assumption that the intersymbol interference is caused by only two edges which are located adjacently before and after the target edge to be decoded. However, actually, the intersymbol interference is also caused by other edges which are away from the target edge on a time axis. Particularly when a tangential skew occurs in the optical disc 1, the diameter of the read-out spot extends to the forward and backward directions, and the effect of the edges of pits which are located far away becomes larger. In order to remove the intersymbol interference caused by the far edges, elements input to the memories 87 and 107 may be enlarged in the forward and backward directions by the above extension amount of the read-out spot as shown in FIG. 31, for example.

That is, in the above description, the model as represented by the following equation is considered as a model of the RF signal in which any intersymbol interference occurs.

$$Va(n)=(\Delta r \cdot an)+Ha(bn,an,bn-1)+C \qquad (18)$$

Figure 31:
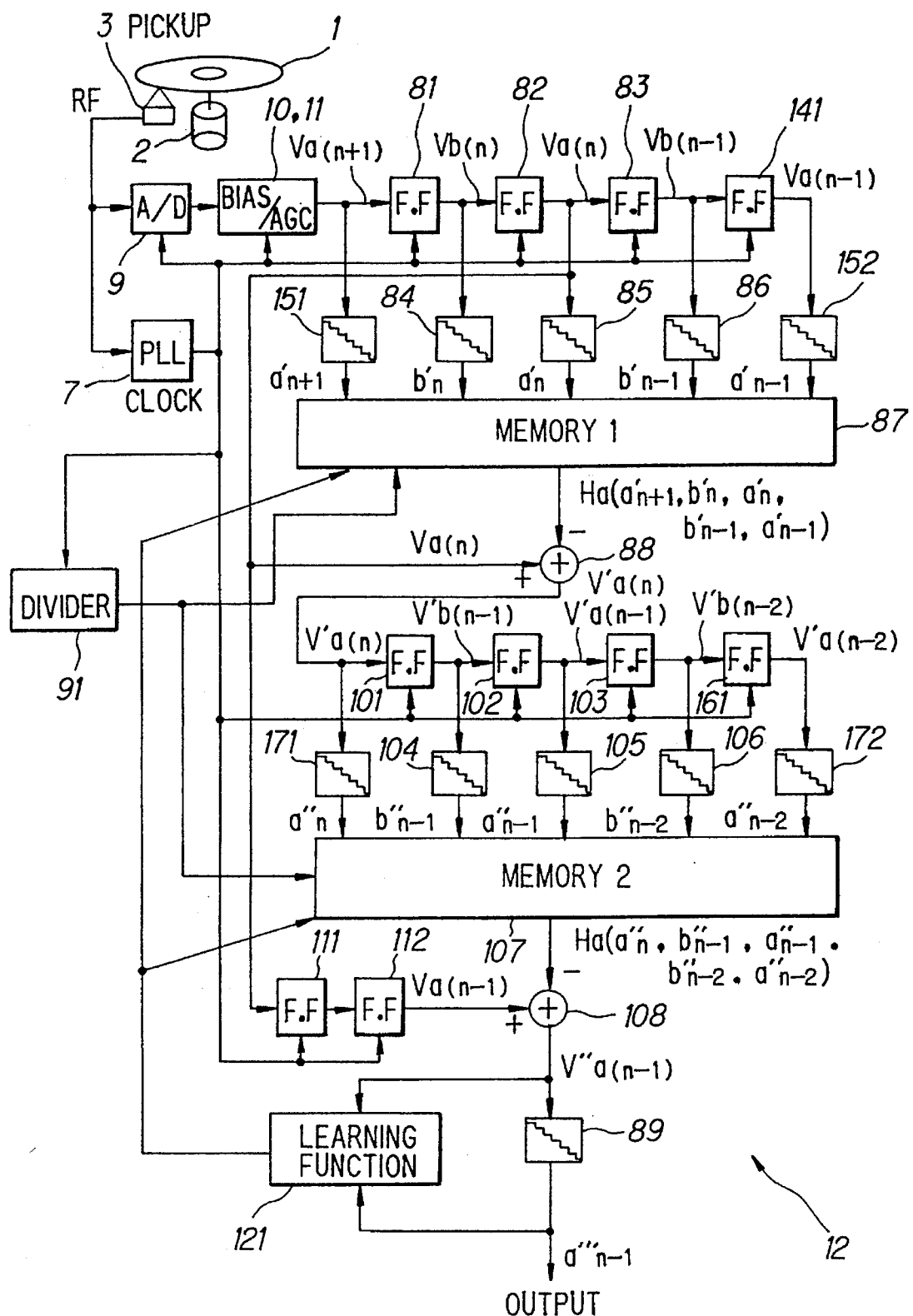
FIG. 31 is a block diagram showing another construction of the non-linear equalizer.

However, in the embodiment shown in FIG. 31, the following model is considered:

$$Va(n)=(\Delta r \cdot an)\ Ha(an+1,bn,an,bn-1,an-1)+C \qquad (19)$$

That is, in this case, the correction values for which an intersymbol interference caused by two pairs of edges (totally four edges) which are located before and after the target edge to be decoded are considered are stored in the memories 87 and 107. In this embodiment, the circuit construction is more simplified, however, the capacity of the memories 87 and 107 is required to be large.

Figure 32:
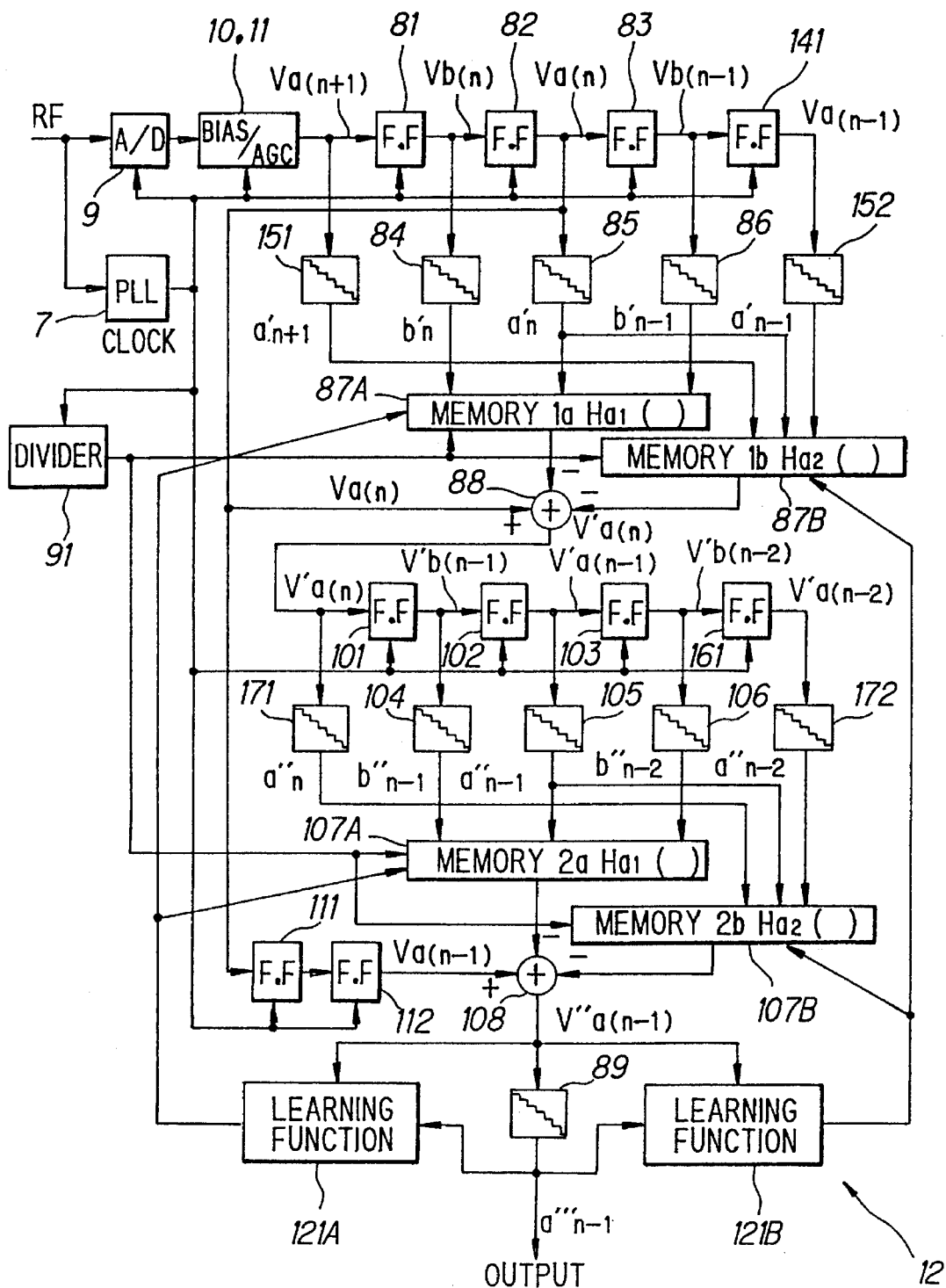
FIG. 32 is a block diagram showing the construction of another embodiment of the non-linear equalizer.

In view of the foregoing, each of the memories 87 and 107 may be divided to two parts A and B as shown in FIG. 32, for example.

That is, in this embodiment, the intersymbol interference is divided into two parts so that it is represented by the following model:

$$Va(n)=(\Delta r \cdot an)+Ha1(bn,an,bn-1)+Ha\ 2(an+1,an,an-1)+C \qquad (20)$$

Like the embodiment of FIG. 25, the memories 87A and 107A are stored with a correction value Ha1 for correcting the intersymbol interference caused by two first edges which are located just after and before the target edge. On the other hand, the memories 87B and 107B are stored with a correction value Ha2 for correcting the intersymbol interference caused by the other two edges which are located far away from the target edge and just after and before the first two edges. Strictly, it would be wrong to divide the whole intersymbol interference into two parts as described above. However, the intersymbol interference caused by the edges which are located far away from the target edge has a smaller value, so that such an intersymbol interference can be sufficiently suppressed in the above method.

Accordingly, in this embodiment, the output of the flip flop 82 is decoded by the decoding circuit 85 and then supplied to the memory 87B. In addition, a flip flop 141 is further provided at the subsequent stage to the flip flop 83, and a storage value of the flip flop 141 is decoded by a decoding circuit 152 and then supplied to the memory 87B. Further, data at the input stage of the flip flop 81 are decoded by the decoding circuit 151, and then supplied to the memory 87B.

Likewise, at a second stage, the output of the flip flop 102 is decoded by the decoding circuit 105, and then supplied to the memory 107B. In addition, a flip flop 161 is provided at the subsequent stage to the flip flop 103, and a storage value of the flip flop 161 is decoded by the decoding circuit 172 and then supplied to the memory 107b. Further, data at the input stage of the flip flop 101 are decoded by the decoding circuit 171 and then supplied to the memory 107B.

Further, in this embodiment, the outputs of the memories 87A and 87B are supplied to the adding circuit 88. At the second stage, the outputs of the memories 107A and 107B are supplied to the adding circuit 108. The storage values of the memories 87 and 107A are renewed in correspondence with the output of a learning function circuit 121A, and the storage values of the memories 87B and 107B are renewed in correspondence with the output of a learning function circuit 121B.

The learning function circuits 121A and 121A are designed in the same construction as the learning function circuit shown in FIG. 25.

Figure 33:
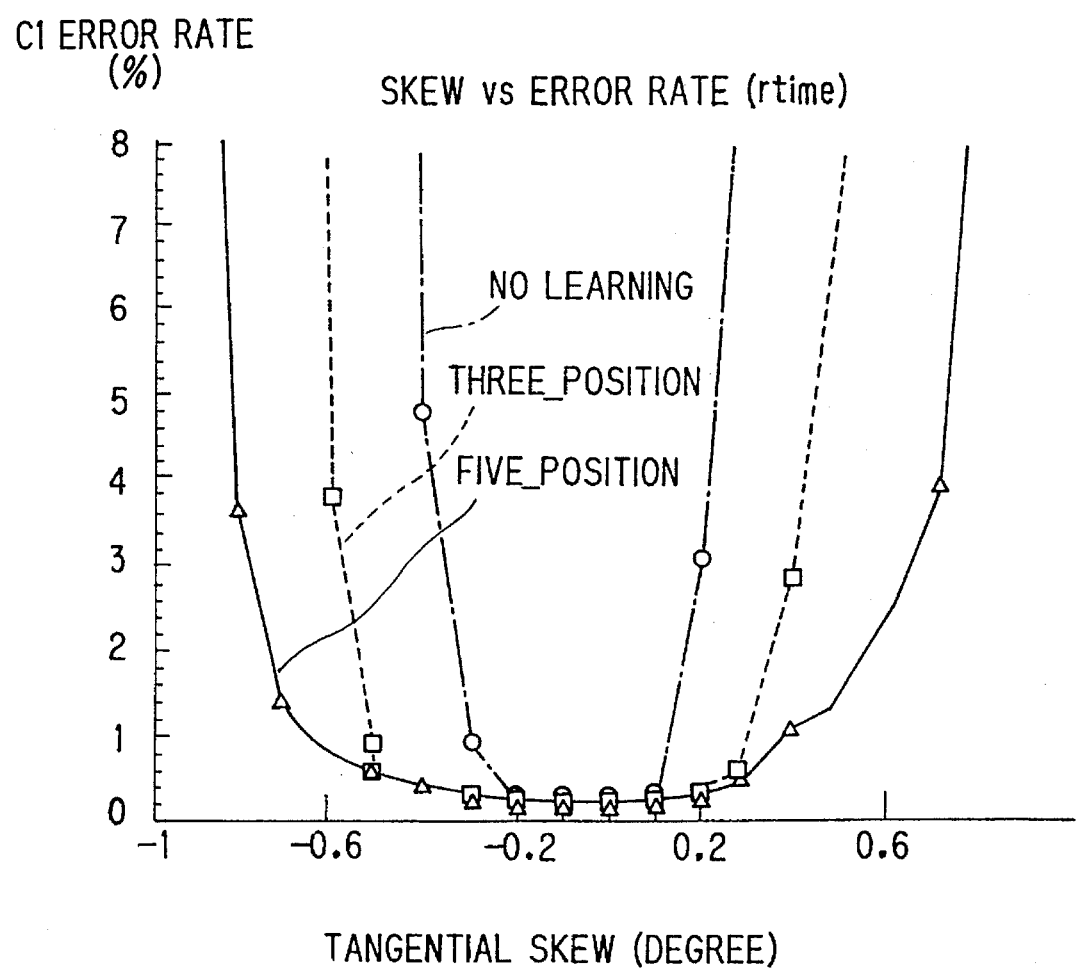
FIG. 33 is a graph showing a decoding result when the edge number in consideration of the intersymbol interference is varied.

FIG. 33 shows an experiment result for the performance of the non-linear equalizer when the number of edges for which the intersymbol interference was considered was varied, and which was obtained by measuring the error rate using the same error correction (CIRC) as used for CDs. In this experiment, the following three cases are compared: a case where no storage value of the memories 87 and 107 is renewed like the embodiment shown in FIG. 30 (no learning case); a case where the intersymbol interference caused by three edges is considered and learned (3-position case) like the embodiment shown in FIG. 25; and a case where the intersymbol interference caused by five edges is considered and learned (5-position case) like the embodiment shown in FIG. 32. According the experiment result, it is apparent that as the number of the edges to be considered for the intersymbol interference is larger, the skew is also greater, however, occurrence of the Cl error is suppressed. In FIG. 33, the Cl error rate is set to 100% when the number of Cl errors per second is equal to 7350.

Figure 34:
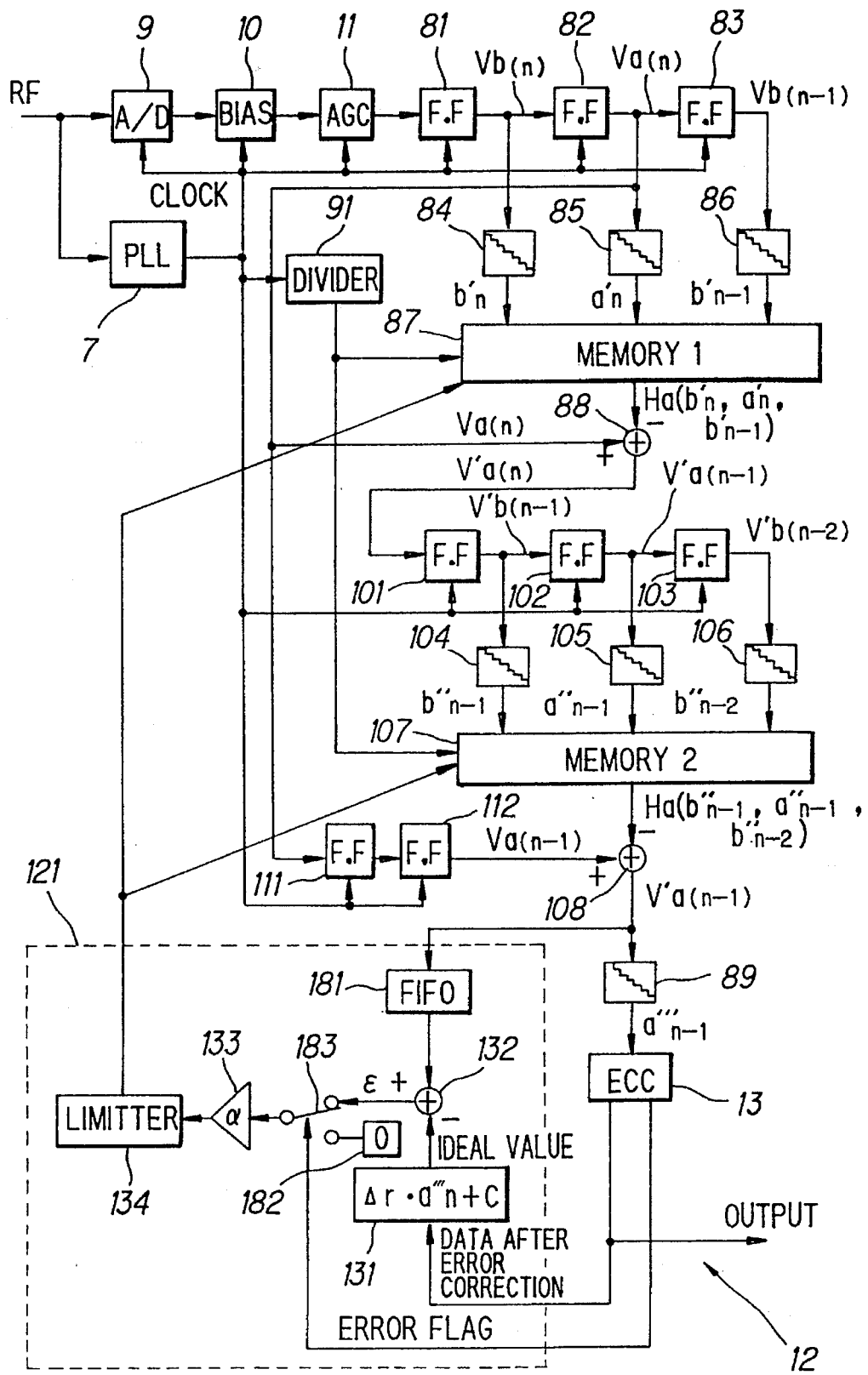
FIG. 34 is a block diagram showing the construction of another embodiment of the non-linear equalizer.

FIG. 34 shows another embodiment. In this embodiment, data decoded by the decoding circuit 89 are input to the error detecting and correcting (ECC) circuit 13, and output to a circuit (not shown) after the error is detected and corrected. The error-corrected data are supplied to the calculation circuit 131 to calculate an ideal value, and then supplied to the adding circuit 132. In this case, a time lag corresponding to a processing time of the error detecting and correcting circuit 13 occurs. Therefore, the output of the adding circuit 108 is delayed by a time corresponding to the above time lag in an FIFO 181, and then supplied to the adding circuit 132 to be added with the output of the calculation circuit 131. The output of the adding circuit 132 is supplied to a multiplying circuit 133 and a limiter 134 through a switch 183, and then supplied to the memories 87 and 107. Accordingly, the storage values of the memories 87 and 107 are inhibited from being renewed in accordance with the erroneous data.

Further, in this embodiment, when the error detecting and correcting circuit 13 detects an error, the switch 183 is switched to the lower side in FIG. 34, so that a "0" level which is generated in a generating circuit 182 is output as a renew value. As a result, even when any uncorrectable error exists in the reproduced signal due to defects on the optical disc 1 or the like, the storage values of the memories 87 and 107 are prevented from being renewed to incorrect values.

Figure 35:
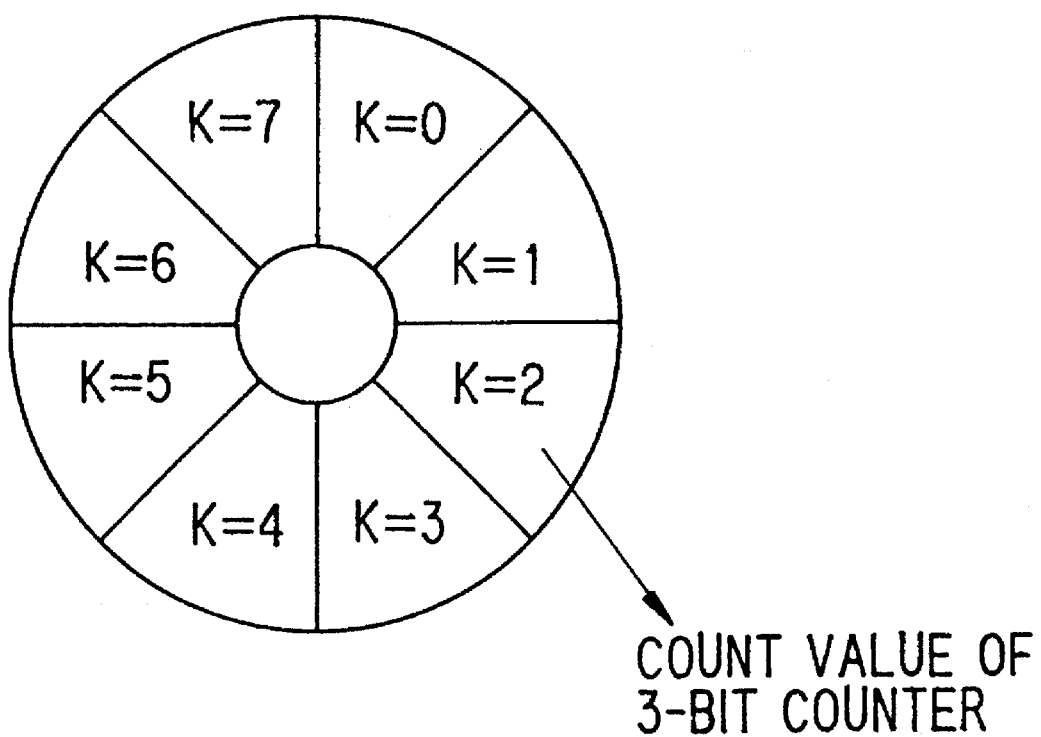
FIG. 35 is a diagram showing a rotational position of the disc.

An optical disc 1 is formed mainly of plastic material, and thus its flatness is varied in accordance with environmental temperature and humidity. Therefore, waveform distortion of the reproduced signal from such an optical disc 1 is varied in accordance with a rotational angle of the optical disc because skew is varied in accordance with a rotational position of the optical disc. In the above embodiment, the storage value of the memory can be renewed at high speed. Accordingly, for example, the optical disc 1 may be sectioned to a predetermined number of areas (eight areas in this embodiment) as shown in FIG. 35 to learn a correction value for intersymbol interference every area.

Figure 36:
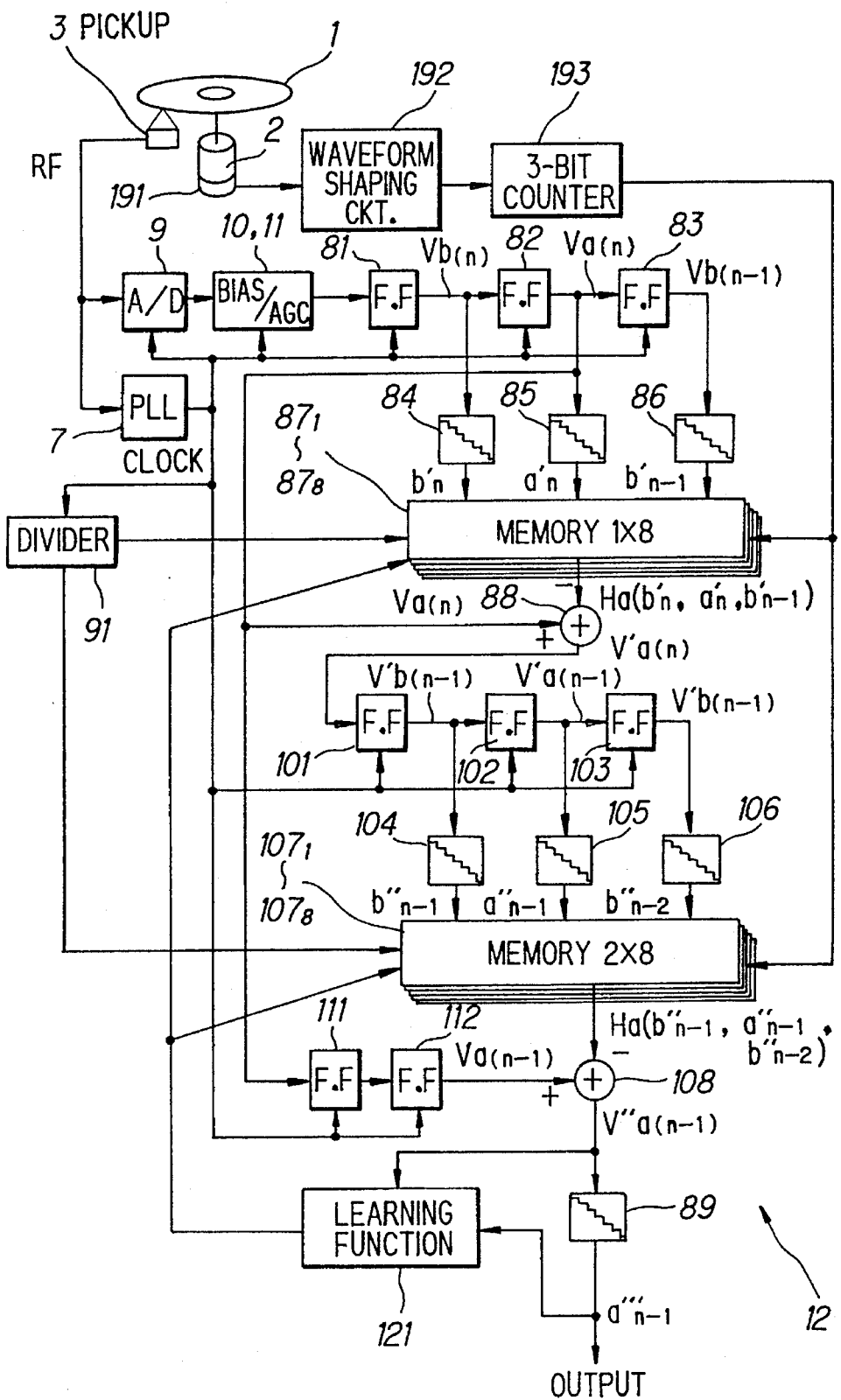
FIG. 36 is a block diagram showing the construction of another embodiment of the non-linear equalizer.

That is, as shown in FIG. 36, a rotary encoder 191 is connected to the spindle motor 2, and the output thereof is subjected to a waveform shaping in a waveform shaping circuit 192. The output of the waveform shaping circuit 192 is counted by a 3-bit counter 193. The count value of the 3-bit counter 193 is incremented by "1" every time the optical disc 1 is rotated by ⅛ as shown in FIG. 35. Accordingly, the count value corresponds to any one of the eight areas as represented by K=0 to K=7. In this embodiment, eight memories $87_1$ to $87_8$ (memories $107_1$ to $107_8$) are provided as the memory 87 (107). Correction values for intersymbol interferences which correspond to the eight rotational angular areas shown in FIG. 35 are stored in the memories $87_1$ to $87_8$ (memories $107_1$ to $107_8$) respectively, and the bank of each memory is switched to another in accordance with its rotational position to renew a correction value every area.

Even when any skew exists, the variation of the intersymbol interference caused by the skew is varied at a constant period because the optical disc 1 is rotated at a predetermined period. Accordingly, when the bank is switched in accordance with the rotational position like this embodiment, the variation of the intersymbol interference within each rotational position becomes small, and the storage value is not required to be varied at high speed, so that the learning (renew or the storage value) for external disturbances other than the above variation can be performed at high speed. This embodiment has a merit particularly when the optical disc 1 is rotationally driven at a constant angular velocity (CAV), however, it is also effective when the optical disc is rotationally driven at a constant linear velocity (CLV).

Figure 37:
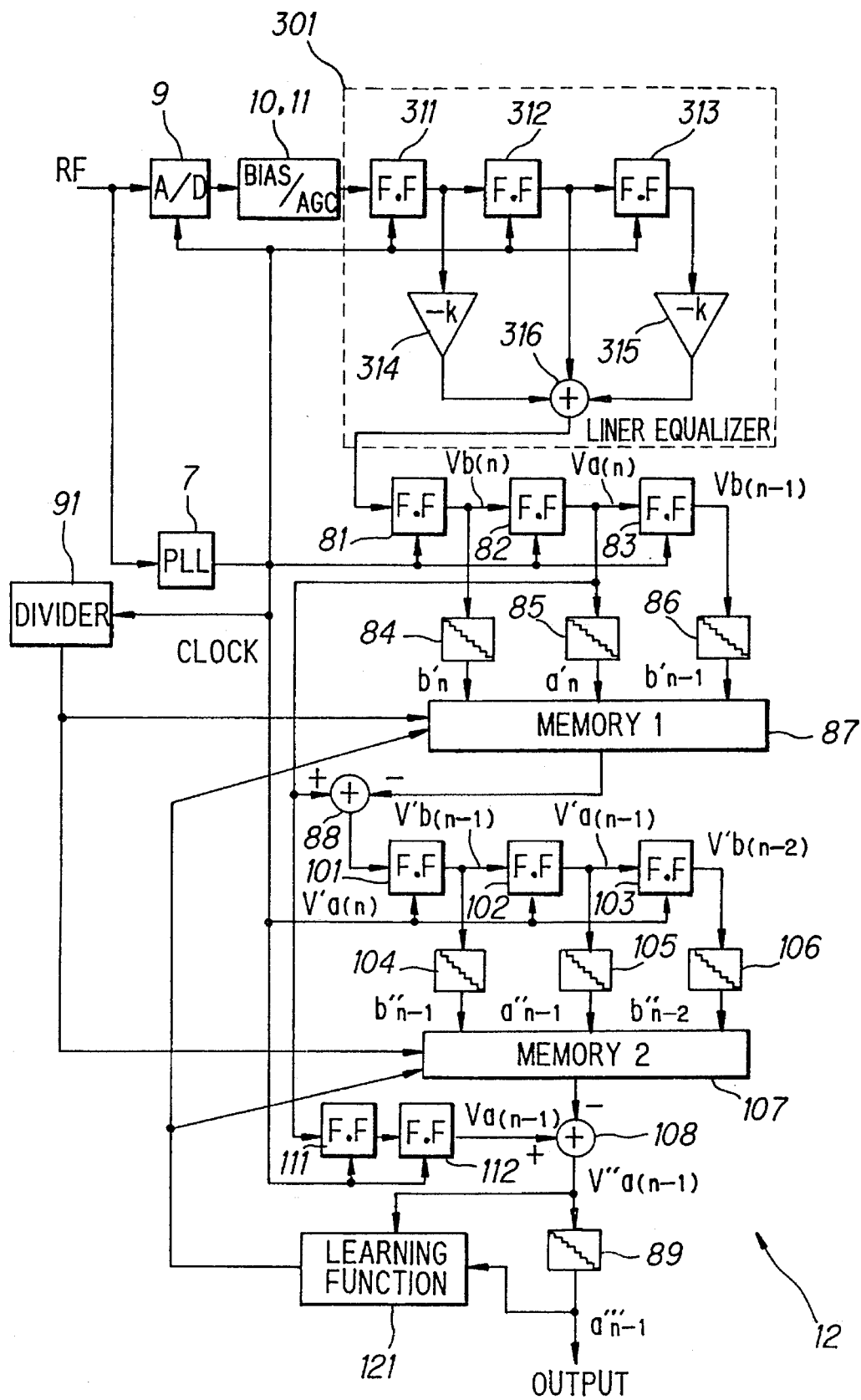
FIG. 37 is a block diagram showing the construction of another embodiment of the non-linear equalizer.

FIG. 37 shows another embodiment. In this embodiment, the output of the AGC circuit 11 is input to the non-linear equalizer 12 through a linear equalizer 301. The other construction is identical to that of the embodiment show in FIG. 25.

In this embodiment, the linear equalizer 301 comprises an FIR filter including flip flops 311 to 313, multiplying circuits 314 and 315 and an adding circuit 316. Data are successively transmitted to the subsequent stage by one clock through the flip flops 311 to 313. The data stored in the flip flops 311 and 313 are multiplied by a coefficient of −k in the multiplying circuits 314 and 315 respectively, and added with the data stored in the flip flop 312 by the adding circuit 316.

Representing the period of an unit clock in this circuit by τ, an impulse response h (t) thereto is represented by the following equation:

$$h(t)=\delta(t)-k(\delta(t+\tau)+\delta(t-\tau)) \tag{21}$$

Accordingly, the frequency response H(f) of the linear equalizer 301 is represented by the following equation:

$$H(f)=1-2k\cos(2\pi f\tau) \tag{22}$$

As described above, the linear equalizer 301 may be disposed at the front stage of the non-linear equalizer 12 to before remove the intersymbol interference to some extent. As a result, the intersymbol interference to be removed in the non-linear equalizer 12 is more reduced in this embodiment than in the case using no linear equalizer 301, and the intersymbol interference can be more suppressed as a whole.

In the embodiment where the correction values stored in the memories 87 and 107 are automatically renewed, as described above, the storage values are gradually corrected to the correct values through the feedback operation. However, when the initial values stored in the memories 87 and 107 are greatly deviated form the ideal values at a start time of the feedback operation, the correction may not be accurately performed.

For example, in a case where the correction values represented by the equations (14) and (15) are set as initial values, it is expected that the intersymbol interference caused by the edges of the adjacent pits becomes large and thus it is not negligible (if the correction values are set to the same value irrespective of the value of i or j, these values may be excessively deviated from the ideal value).

Figure 38:
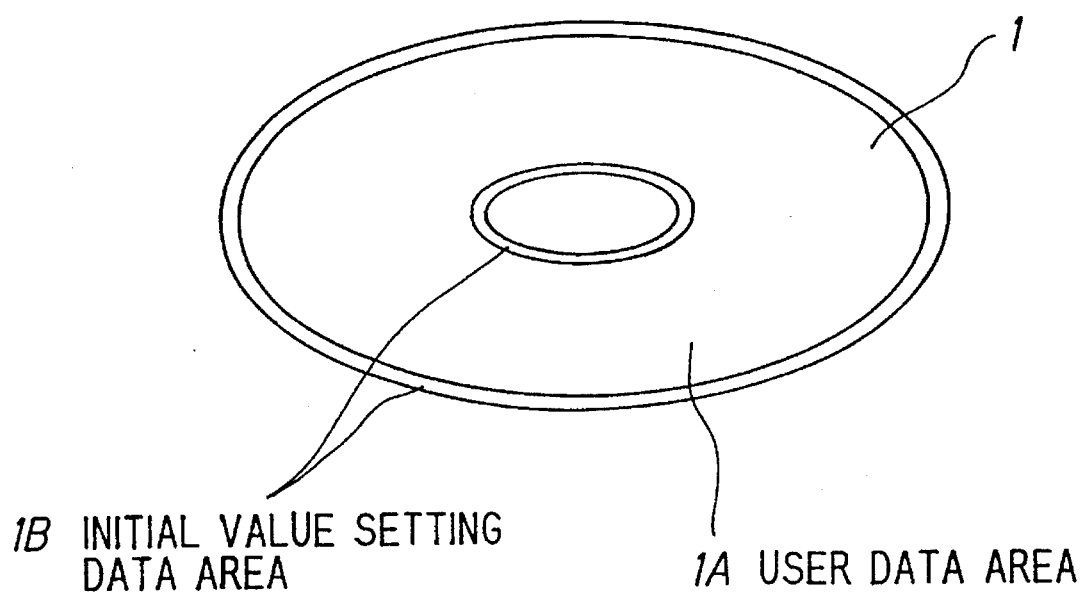
FIG. 38 is a schematic view showing an initial value setting data area of the optical disc 1.

In such a case, for example as shown in FIG. 38, an initial value setting data area 1B is formed at lease one of (in this embodiment, both of) a read-in area on the inner periphery of an user data area 1B on the optical disc 1 and a read-out area on the outer periphery of the user data area 1B, and pits for providing these initial values are beforehand recorded in the initial value setting data area 1B.

That is, like the user data area 1A, servo areas are periodically provided in the initial value setting data area 1B, and clocks are generated in this area to adjust the bias and the gain. Further, initial value data which are calculated by the following method are before recorded in a data area between the servo areas.

With respect to the pits in the initial value setting data area thus recorded, all of the front-end edge position M and the rear-end edge position N of each pit, the rear-end edge position I of a pit just-before and the front-end edge position J of a pit just-after are beforehand known. Accordingly, when $Va(N,M,I)$ and $Vb(J,N,M)$ represent the front-end edge and the rear-end edge of the signals obtained by reproducing the pit, the following equations are satisfied:

$$Va(M,N,I) = \Delta r \cdot M + Ha(N,M,I) + C \quad (23)$$

$$Vb(J,N,M) = \Delta r \cdot N + Hb(J,N,M) + C \quad (24)$$

Therefore, the following values can be calculated as correction values to be recorded in the memory:

$$Ha(N,M,I) = Va(N,M,I) - \Delta r \cdot M - C \quad (25)$$

$$Hb(J,N,M) = Vb(J,N,M) - \Delta r \cdot N - C \quad (26)$$

FIG. 39 shows a table showing pits providing such initial values. In this embodiment, two pits constitute one group. Data of each group are set to constitute a combination of (bn−1,an,bn). All patterns for correcting the intersymbol interference of the front-end edge of the pit can be constructed by 512 groups. Subsequently to the 512 groups, 512 patterns for correcting the intersymbol interference of the rear-end edge of the pit are formed.

As described above, if the initial value is beforehand recorded at a predetermined position on the optical disc 1, this initial value is reproduced if occasion demands (for example, just after actuation is started), and stored into the memories 87 and 107, subsequently the correction value can be successively renewed (corrected) to the correct value.

Finally, an embodiment of a recording apparatus for the optical disc 1 of high recording density as described above.

In FIG. 40, an information source 201 digitalize and outputs an audio signal as a signal to be recorded. An ECC circuit 202 adds the digital audio signal supplied from the information source 201 with an error correction code, and outputs it to a converter 203. The converter 203 converts the input data to data whose data unit comprises 3 bits. In this embodiment, the edge position of each pit is set to any position of eight stages (levels) from "0" to "7". Therefore, in order to specify each edge position, 3-bit data are required. In the converter 203, the 3-bit data are generated.

A clock information generator 205 generates data required to generate clocks which are required to read out data recorded on the optical disc 1 (for example, data "0" corresponding to the rear-end edge of the reference pit P2 of FIG. 10 and data "7" corresponding to the front-end edge of the reference pit P3). A bias gain information generator 206 generates data representing a bias point (data "0" corresponding to the rear end of the reference pit P2 of FIG. 10, or data representing that both of the front-end edge and rear-end edge positions are equal to zero like the reference pit P2), and data for setting the gain (data representing that like the reference pit P3 of FIG. 10, both of the front-end edge and rear-end edge positions are equal to "7").

A PLL lead-in signal generator 207 generates synchronizing data to lead in the PLL (for example, data for setting each edge of the reference pits P1 to P5 of FIG. 10). An educational data generator 208 generates data of (0,0) to (7,7) as edge position data (M,N) of the front end and the rear end of the educational pit 6 of FIG. 10. All the data which are output from the clock information generator 205, the bias gain information generator 206, the PLL lead-in signal generator 207, and the educational data generating circuit 208 are supplied to an adding circuit 204 to be added with the data supplied from the converter 203 (subjected to a time-division multiplexing).

The output of the adding circuit 204 is supplied to a recording edge position calculator 209, and the output of the recording edge position calculator 209 is supplied to an edge modulator 210. The output of the edge modulator 210 is supplied to a mastering device 211 to perform a cutting process, a developing process, a plating process, a transfer process, an aluminum deposition process, a protection-film coating process, etc. to form an optical disc 1.

In the above construction, the edge modulator 210 generates a timing signal having a timing corresponding to the data output from the recording edge position calculator 209, and outputs this signal to the mastering device 211.

The edge modulator 210 is designed to generate a timing signal having a timing at which the edge positions of the front end and the rear end of each pit are shifted from the center reference position of the pit to any one of eight stages (positions) in accordance with digital information to be recorded as shown in FIG. 5., and the timing is set so that the shift period Ts of the edge position of each pit is within a period shorter than the transient period (rise-up time tr or fall time tf) of an RF signal which is determined in accordance with the transfer characteristic of an optical detection system (pickup 3) at the reproducing apparatus side.

The mastering device 211 cuts out a photosensitive film coated on a recording master plate with a laser beam in synchronism with the timing signal supplied from the edge modulator 210. The master plate thus cut is subjected to the developing process and the plating process to form a stamper. Pits formed on the stamper are transferred onto a replica. The replica is subjected to the aluminum-deposition process, and then coated with a protection film to complete a manufacturing process of the optical disc 1.

In the above description, this invention is applied to an optical disc and its reproducing apparatus. However, this invention may be applied to a magnetooptical disc and other kinds of information recording media, and reproducing apparatuses therefor.

As described above, according to the information reproducing apparatus, a correction value corresponding to the data obtained by decoding a reproduced signal is generated and added with a transmission signal, and then this added signal is further decoded. Therefore, even when the intersymbol interference is varied at high speed, the effect of the variation of the intersymbol interference can be rapidly suppressed. In addition, the capacity of the correction value generating means can be reduced.

According to the information reproducing apparatus, a correction value for correcting the intersymbol interference caused by codes adjacent to a target code to be decoded is generated, so that the greatest intersymbol interference can be accurately suppressed.

According to the information reproducing apparatus, a correction value is generated using the reproduction level of an education pit, so that the correction value is prevented from being set to an abnormal value.

According to the information reproducing apparatus, at least 64 education pits are provided, so that the correction value can be accurately set.

According to the information reproducing apparatus, the intersymbol interference caused by nearer codes and the intersymbol interference caused by farther codes are separately and individually corrected, so that the whole capacity of the memory can be reduced.

According to the information reproducing apparatus, the cascade-connection of plural stages is adopted, so that the intersymbol interference can be more accurately suppressed.

According to the information reproducing apparatus, signals to be corrected are reproduced signals from the optical detection system at all the stages, so that the intersymbol interference can be accurately suppressed.

According to the information reproducing apparatus, a target code to be decoded which is supplied to the adding means of each stage is the substantially same code which is not decoded at any stage, so that the intersymbol interference can be accurately suppressed.

According to the information reproducing apparatus, the number of stages to be cascade-connected is set to an even number, so that the correction value can be prevented from being set to an abnormal value.

According to the information reproducing apparatus, the output result of the second decoding means is fed back to renew the correction value, so that the intersymbol interference can be rapidly, accurately and automatically suppressed.

According to the information reproducing apparatus, the correction value is renewed in accordance with the difference between the ideal reproduction level and the actual reproduction level, so that the correction value can be automatically and accurately renewed.

According to the information reproducing apparatus, the correction value is multiplied by a predetermined constant and it is limited, so that the correction value can be prevented from being set to an abnormal value.

According to the information reproducing apparatus, the correction value is renewed in correspondence with a decoding value after error correction, so that the correction value can be accurately set to a value nearer to the correct value.

According to the information reproducing apparatus, the correction value is renewed by selecting any one of the difference between the ideal reproduction level and the actual reproduction level and a predetermined constant, so that the effect of defects on a recording medium or the like can be suppressed.

According to the information reproducing apparatus, the predetermined constant is selected when any error is detected, so that the correction value can be prevented from being set to an abnormal value when any defect exists in the recording medium.

According to the information reproducing apparatus, the correction value is generated in correspondence with the rotational position of the disc medium, so that the correction value corresponding to a skew on the disc medium can be rapidly generated.

According to the information reproducing apparatus, pits providing initial values are collectively recorded in a predetermined area on the disc medium, so that the initial values can be accurately set prior to the reproduction of the disc medium.

According to the information reproducing apparatus, the initial values when the correction value is renewed are collectively recorded in a predetermined area, so that the intersymbol interference can be accurately suppressed when the reproduction is performed in any kind of information reproducing apparatus.

What is claimed is:

1. An information reproducing apparatus for reproducing an information recording medium on which digital information is recorded while the edge position of an information pit is stepwise shifted from a predetermined reference position in accordance with a code being recorded within a predetermined shift period shorter than a transient period of a reproduced signal, which is determined in accordance with a transfer characteristic of an optical detection system for scanning a recording medium with a light beam along an information pit array, including:

clock generating means for generating a clock which is synchronized with a reference position in phase on the basis of a reproduced signal obtained from said optical detection system;

level detection means for detecting the reproduction level within the transient period of the reproduced signal at a timing defined by the clock;

first decoding means for decoding recording data corresponding to the shift amount of the edge position of an information pit;

correction value generating means for storing predetermined correction values to correct errors in a decoding operation, and outputting a correction value in correspondence with the data decoded by said first decoding means;

adding means for adding the correction value with the reproduction level of a target code to be decoded; and second decoding means for decoding the recording data corresponding to the shift amount of the edge position of the information pit on the basis of the output of said adding means.

2. The information reproducing apparatus as claimed in claim 1, wherein said correction value generating means generates a correction value to correct the intersymbol interference caused by a code which is adjacent to the target code.

3. The information reproducing apparatus as claimed in claim 2, wherein said correction value generating means beforehand generates correction values with the reproduction levels of educational pits which are provided as information pits to obtain decode values of all edge patterns.

4. The information reproducing apparatus as claimed in claim 3, wherein at least 64 of educational pits are provided on the disc medium.

5. The information reproducing apparatus as claimed in claim 3, wherein said correction value generating means includes a first memory for storing a first correction value to correct the intersymbol interference caused codes which are located adjacently before and after the target code, and a second memory for storing a second correction value to correct the intersymbol interference caused by codes which are located at front and rear sides of the target code and each of which corresponds to a second code from the target code, and wherein said adding means adds the reproduction level with the first and second correction values.

6. The information reproducing apparatus as claimed in claim 3, wherein a plurality of groups each comprising said first decoding means, said correction value generating means and said adding means are connected to one another in a cascade connection.

7. The information reproducing apparatus as claimed in claim 6, wherein at all of the plurality of groups of the cascade-connection, signals to be corrected are reproduced signals which are obtained from an optical detection element.

8. The information reproducing apparatus as claimed in claim 7, wherein the target code to be supplied to said adding means in all of the plurality of groups are substantially the same code which is not added with the correction value at any adding means of any stage.

9. The information reproducing apparatus as claimed in claim 8, wherein the number of groups of the cascade-connected groups is set to an even number.

10. The information reproducing apparatus as claimed in claim 1 or 9, further including altering means for altering the correction value of said correction value generating means by feeding back the output result of said second decoding means.

11. The information reproducing apparatus as claimed in claim 10, wherein said altering means includes ideal value calculating means for calculating the ideal reproduction level from the output of said second decoding means, and difference means for calculating a difference value between the ideal reproduction level and the actual reproduction level to alter the correction value of said correction value generating means in accordance with the difference value.

12. The information reproducing apparatus as claimed in claim 11, wherein said altering means includes multiplying means for multiplying the difference value by a constant to prevent oscillation of the correction value of said correction value generating means, and limiter means for limiting the output of said multiplying means within a predetermined range.

13. The information reproducing apparatus as claimed in claim 9, further including detection error correcting means for detecting presence or absence of an error for the output of said second decoding means and correcting the error, and altering means for altering the correction value of said correction value generating means in accordance with a decode value after the error correction.

14. The information reproducing apparatus as claimed in claim 13, wherein said altering means includes ideal value calculating means for calculating the ideal reproduction level from the output of said correction means, difference means for calculating the difference value between the ideal reproduction level and the actual reproduction level, and selection means for selecting any one of the difference value of said difference means and a predetermined constant in accordance with the result of said error detecting and correcting means.

15. The information reproducing apparatus as claimed in claim 14, wherein said selection means selects the difference value of said difference means when no error is detected by said error detecting and correcting means, and selects the predetermined constant when any error is detected.

16. The information reproducing apparatus as claimed in any one of claims 1 to 15, wherein said correction value generating means generates a correction value which is varied in accordance with a rotational position of the disc medium which is sectioned into a predetermined number of parts.

17. The information reproducing apparatus as claimed in claim 16, wherein pits providing initial values of said correction value generating means are collectively recorded in a predetermined area of the disc medium.

18. An information recording medium which is recorded by the information reproducing apparatus as claimed in claim 17, wherein the initial values to alter the correction value of said correction value generating means are collectively recorded in a predetermined area.

\* \* \* \* \*